United States Patent
Nakada

(10) Patent No.: US 10,819,690 B2
(45) Date of Patent: Oct. 27, 2020

(54) COMMUNICATION DEVICE AND COMMUNICATION METHOD

(71) Applicant: NEC Corporation, Minato-ku, Tokyo (JP)

(72) Inventor: Tatsuhiro Nakada, Tokyo (JP)

(73) Assignee: NEC CORPORATION, Tokyo (JP)

(*) Notice: Subject to any disclaimer, the term of this patent is extended or adjusted under 35 U.S.C. 154(b) by 119 days.

(21) Appl. No.: 16/079,150

(22) PCT Filed: Feb. 27, 2017

(86) PCT No.: PCT/JP2017/007368
§ 371 (c)(1),
(2) Date: Aug. 23, 2018

(87) PCT Pub. No.: WO2017/150417
PCT Pub. Date: Sep. 8, 2017

(65) Prior Publication Data
US 2019/0097988 A1    Mar. 28, 2019

(30) Foreign Application Priority Data
Mar. 4, 2016    (JP) .................................. 2016-041744

(51) Int. Cl.
*H04L 29/06* (2006.01)
*H04L 29/14* (2006.01)
(Continued)

(52) U.S. Cl.
CPC ........... *H04L 63/08* (2013.01); *H04B 10/075* (2013.01); *H04B 10/80* (2013.01); *H04B 10/85* (2013.01); *H04L 63/126* (2013.01); *H04L 69/40* (2013.01)

(58) Field of Classification Search
CPC ....... H04L 63/08; H04L 63/126; H04L 69/40; H04L 29/06; H04L 29/14; H04B 10/075; H04B 10/0771; H04B 10/80; H04B 10/85
See application file for complete search history.

(56) References Cited

U.S. PATENT DOCUMENTS 3,426,879 A * 2/1969 Cowden .................... G07F 7/04
                                                    194/207
3,436,552 A * 4/1969 Bayha ....................... G07D 7/00
                                                    250/556
(Continued)

FOREIGN PATENT DOCUMENTS

CN        101667864 A       3/2010
CN        101931460 A      12/2010
(Continued)

OTHER PUBLICATIONS

Japanese Office Action for JP Application No. 2018-503126 dated Dec. 3, 2019 with English Translation.
(Continued)

*Primary Examiner* — Jayesh M Jhaveri

(57) ABSTRACT

A communication device configured to include a communication unit a monitoring unit, a control unit, and an authentication unit. The communication unit transmits and receives an optical signal to and from an opposed device via a transmission line. The monitoring unit monitors a transfer state of the transmitted optical signal. The control unit transmits a signal based on a dummy pattern instead of actual data when the monitoring unit detects that a failure occurs in transfer of the optical signal. The authentication unit authenticates start of transmission of a signal based on the actual data, when the monitoring unit detects elimination of the failure, while the signal based on the dummy pattern is being transmitted. Moreover, the control unit transmits the signal based on the actual data instead of the dummy pattern (Continued)

when the start of transmission is authenticated by the authentication unit.

12 Claims, 14 Drawing Sheets

(51) Int. Cl.
*H04B 10/80* (2013.01)
*H04B 10/85* (2013.01)
*H04B 10/075* (2013.01)

(56) References Cited

U.S. PATENT DOCUMENTS

| | | | | |
|---|---|---|---|---|
| 3,508,205 | A * | 4/1970 | Kubie | G06F 21/79 |
| | | | | 711/164 |
| 6,684,347 | B1 * | 1/2004 | Coffey | H04L 29/06 |
| | | | | 370/247 |
| 7,016,605 | B2 * | 3/2006 | Stevens | H04Q 11/0005 |
| | | | | 398/19 |
| 2001/0033406 | A1 * | 10/2001 | Koike | H04B 10/00 |
| | | | | 398/128 |
| 2003/0011855 | A1 * | 1/2003 | Fujiwara | H04B 10/0771 |
| | | | | 398/177 |
| 2005/0169629 | A1 * | 8/2005 | Shioda | H04B 10/075 |
| | | | | 398/5 |
| 2009/0022489 | A1 * | 1/2009 | Way | H04J 14/0275 |
| | | | | 398/4 |
| 2010/0254649 | A1 * | 10/2010 | Schofield | H04B 10/85 |
| | | | | 385/11 |
| 2012/0147757 | A1 | 6/2012 | Zhang | |
| 2013/0322875 | A1 * | 12/2013 | Iijima | H04B 10/0775 |
| | | | | 398/37 |
| 2017/0143212 | A1 * | 5/2017 | Ishikawa | A61B 5/4064 |
| 2019/0158174 | A1 * | 5/2019 | Mentovich | H04B 10/50 |

FOREIGN PATENT DOCUMENTS

| | | |
|---|---|---|
| CN | 103595488 A | 2/2014 |
| EP | 3051759 A1 | 8/2016 |
| JP | H05-145492 A | 6/1993 |
| JP | H11-284574 A | 10/1999 |
| JP | 2001-217778 A | 8/2001 |
| JP | 2012-039287 A | 2/2012 |
| JP | 2012-109653 A | 6/2012 |
| JP | 2012-523021 A | 9/2012 |
| WO | 2013/121826 A1 | 8/2013 |

OTHER PUBLICATIONS

International Search Report for PCT Application No. PCT/JP2017/007368, dated Mar. 28, 2017.
English translation of Written opinion for PCT Application No. PCT/JP2017/007368.
Extended European Search Report for EP Application No. EP17759883.6 dated Oct. 16, 2019.
Chinese Office Action for CN Application No. 201780014869.3 dated Jul. 3, 2020 with English Translation.

* cited by examiner

COMMUNICATION DEVICE AND COMMUNICATION METHOD

This application is a National Stage Entry of PCT/JP2017/007368 filed on Feb. 27, 2017, which claims priority from Japanese Patent Application 2016-041744 filed on Mar. 4, 2016, the contents of all of which are incorporated herein by reference, in their entirety.

TECHNICAL FIELD

The present invention relates to improvement of safety in transfer of an optical signal, and particularly relates to a technique of preventing interception of an optical signal.

BACKGROUND ART

Since an optical communication network is widely used, a demand for security is increased. For example, even in an undersea cable system which transfers an optical signal by use of an optical fiber laid undersea, importance of preventing leakage of information in an accommodated channel is increasing.

In an undersea cable system, a user channel signal is accommodated in an undersea terminal station device, and an optical signal is transferred between undersea terminal station devices disposed at both ends of an undersea cable. In such an undersea cable system, when a third party intending to illegally acquire information connects an interception device to an undersea terminal station device or the like, there is concern that information of the user channel signal may be intercepted by the third party. Thus, in the case of connection of an interception device, or the like, it is desirable that there exists a technique of preventing leakage of information via the interception device, and related development is underway. For example, a technique as in PTL 1 is disclosed as a technique of preventing leakage of information in such a case that an interception device or the like is connected.

PTL 1 relates to a technique of monitoring a polarization state of an optical fiber, and detecting fiber tapping. In a method of detecting fiber tapping in PTL 1, a polarization state of an optical fiber is monitored, and it is determined that the optical fiber is bent due to fiber tapping when a change equal to or more than a predetermined standard is made in the polarization state. PTL 1 describes that security measures can be taken for a network by detecting fiber tapping on the basis of a polarization state.

CITATION LIST

Patent Literature

[PTL 1] Japanese Translation of PCT International Application Publication No. JP-T-2012-523021

SUMMARY OF INVENTION

Technical Problem

However, the technique according to PTL 1 is not satisfactory for the following point. In PTL 1, whether or not an optical fiber is processed is determined on the basis of a polarization state of light transferred by the optical fiber. Thus, after an optical fiber is processed, transfer of an optical signal is resumed, and before whether or not a polarization state is more than a predetermined standard is determined, there is a possibility that an optical signal transferred via the optical fiber is intercepted. Therefore, the technique according to PTL 1 is not satisfactory as a technique of preventing leakage of information when an interception device or the like is connected.

In order to solve the problem described above, the present invention is intended to obtain a communication device with which it is possible to more certainly prevent leakage of information when an interception device or the like is connected.

Solution to Problem

In order to solve the problem described above, a communication device according to the present invention includes a communication means, a monitoring means, a control means, and an authentication means. The communication means transmits and receives an optical signal to and from an opposed device being a communication device opposed via a transmission line. The monitoring means monitors a transfer state of the optical signal transmitted from the communication means. The control means includes a means that transmits a signal based on a dummy pattern from the communication means instead of actual data when the monitoring means detects that a failure occurs in transfer of the optical signal. The authentication means checks whether or not start of transmission of a signal based on the actual data is possible, and authenticates the start of transmission, when the monitoring means detects elimination of the failure, while the signal based on the dummy pattern is being transmitted. Moreover, the control means further includes a means that transmits the signal based on the actual data instead of the dummy pattern from the communication means when the start of transmission is authenticated.

A communication method according to the present invention includes transmitting and receiving an optical signal to and from an opposed device being a communication device opposed via a transmission line, and monitoring a transfer state of the transmitted optical signal. The communication method according to the present invention includes transmitting a signal based on a dummy pattern instead of actual data when detecting that a failure occurs in transfer of the optical signal. The communication method according to the present invention includes checking whether or not start of transmission of a signal based on the actual data is possible, when detecting elimination of the failure, while the signal based on the dummy pattern is being transmitted. The communication method according to the present invention includes transmitting the signal based on the actual data instead of the dummy pattern when the start of transmission of the signal based on the actual data is authenticated.

Advantageous Effects of Invention

According to the present invention, it is possible to more certainly prevent leakage of information when an interception device or the like is connected.

EXAMPLE EMBODIMENT

First Example Embodiment

Figure 1:
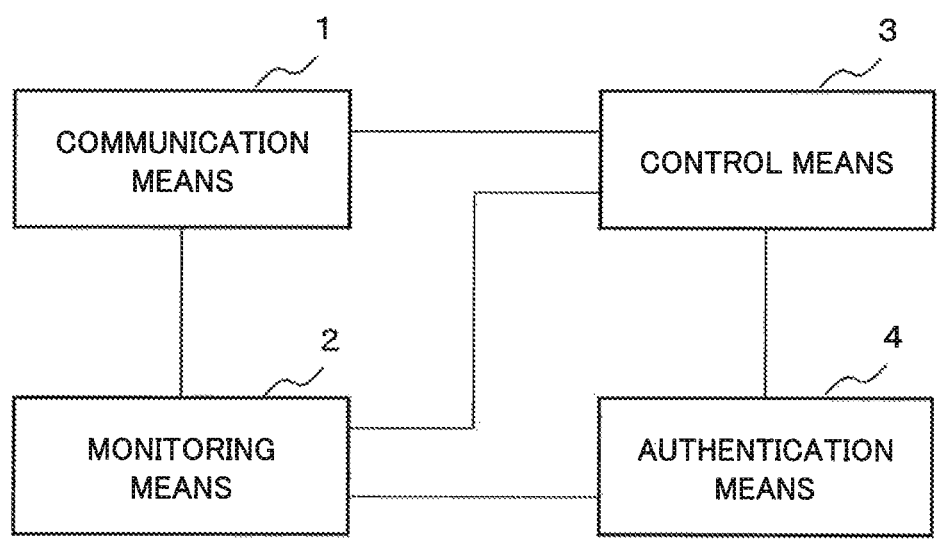
FIG. 1 is a diagram illustrating an overview of a configuration according to a first example embodiment of the present invention.

A first example embodiment of the present invention is described in detail with reference to the drawing. FIG. 1 is a block diagram illustrating an overview of a configuration of a communication device according to the present example embodiment. The communication device according to the present example embodiment includes a communication means 1, a monitoring means 2, a control means 3, and an authentication means 4. The communication means 1 transmits and receives an optical signal to and from an opposed device being a communication device opposed via a transmission line. The monitoring means 2 monitors a transfer state of the optical signal transmitted from the communication means 1. The control means 3 includes a means for transmitting a signal based on a dummy pattern from the communication means 1 instead of actual data when the monitoring means 2 detects that a failure is occurring in transfer of the optical signal. The authentication means 4 checks whether or not start of transmission of a signal based on the actual data is possible, and authenticates the start of transmission, in the case where the monitoring means 2 detects elimination of the failure, when the signal based on the dummy pattern is being transmitted. Moreover, the control means 3 further includes a means for transmitting the signal based on the actual data instead of the dummy pattern from the communication means 1 when the start of transmission is authenticated by the authentication means 4.

The communication device according to the present example embodiment transmits the signal based on the dummy pattern by the control means 3 when the monitoring means 2 detects that a failure has occurred in transfer of the optical signal. Moreover, in the communication device according to the present example embodiment, the transmission of the signal based on the dummy pattern is continued when elimination of the failure is detected, and the control means 3 transmits the signal based on the actual data instead of the dummy pattern signal when the start of transmission of the actual data is authenticated by the authentication means 4. Thus, even after the failure is eliminated and then reception of a signal is started in the opposed device, the communication device according to the present example embodiment only transmits the signal based on the dummy pattern without transmitting the actual data until authentication is performed. Therefore, when an interception device or the like for interception of communication is attached, it is possible to avoid interception of communication due to resumption of transmission of the actual data before removal of the interception device, or the like after the failure of reception of a signal is eliminated. As a result, by using the communication device according to the present example embodiment, it is possible to more certainly prevent leakage of information when an interception device or the like is connected.

Second Example Embodiment

Figure 2:
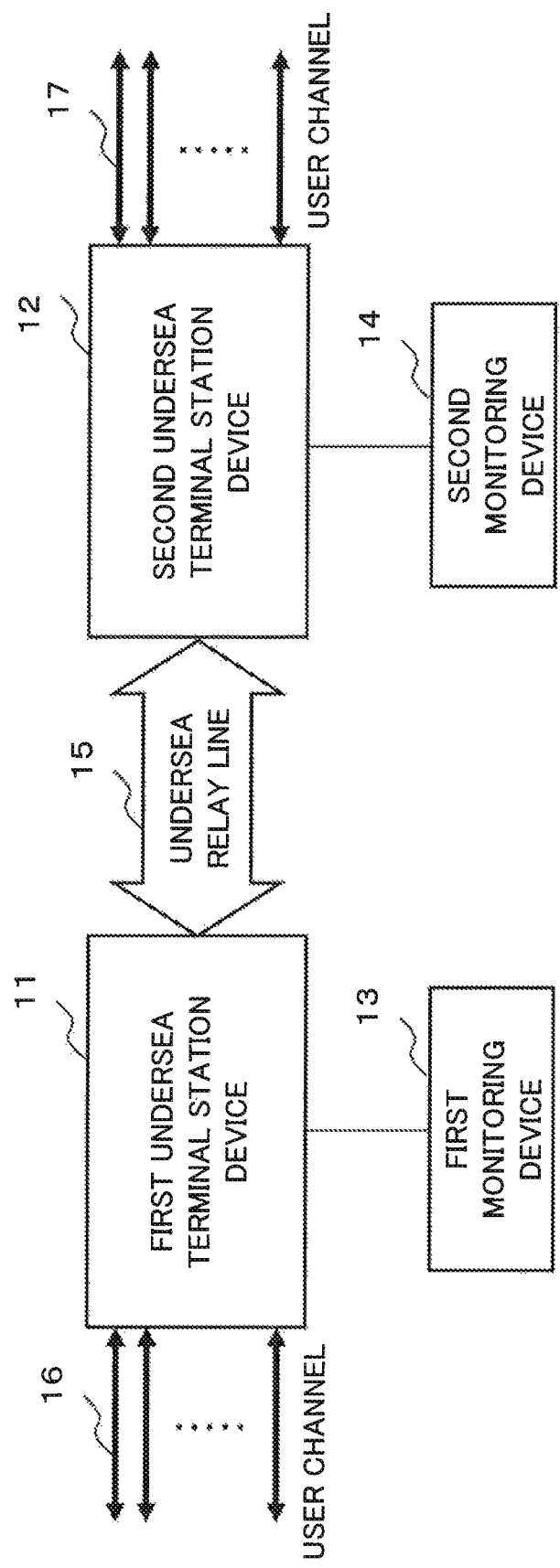
FIG. 2 is a diagram illustrating an overview of a configuration according to a second example embodiment of the present invention.

A second example embodiment of the present invention is described in detail with reference to the drawings. FIG. 2 illustrates an overview of a configuration of an optical communication system according to the present example embodiment. The optical communication system according to the present example embodiment includes a first undersea terminal station device 11, a second undersea terminal station device 12, a first monitoring device 13, a second monitoring device 14, and an undersea relay line 15. The first undersea terminal station device 11 and the second undersea terminal station device 12 in the optical communication system according to the present example embodiment are connected to each other via the undersea relay line 15. The first undersea terminal station device 11 is further connected to a plurality of user channels 16. Moreover, the second undersea terminal station device 12 is further connected to a plurality of user channels 17. A user channel 16 and a user channel 17 connected to the first undersea terminal station device 11 and the second undersea terminal station device 12, respectively, may be singular.

In the optical communication system according to the present example embodiment, an optical signal of a wavelength division multiplex (WDM) scheme is transmitted and received between the first undersea terminal station device 11 and the second undersea terminal station device 12 via the undersea relay line 15. The optical communication system according to the present example embodiment is an undersea cable system which transmits and receives an optical signal between the first undersea terminal station device 11 and the second undersea terminal station device 12 via the undersea relay line 15 laid undersea.

The first undersea terminal station device 11 multiplexes a signal input from the user channel 16 and then transmits a multiplexed signal to the second undersea terminal station device 12 via the undersea relay line 15. The second undersea terminal station device 12 separates the multiplexed signal received via the undersea relay line 15 and then transmits the multiplexed signal to the user channel 17. Further, the second undersea terminal station device 12 multiplexes a signal input from the user channel 17 and then transmits a multiplexed signal to the first undersea terminal station device 11 via the undersea relay line 15. The first undersea terminal station device 11 separates the multiplexed signal received via the undersea relay line 15 and then transmits the multiplexed signal to the user channel 16.

Figure 3:
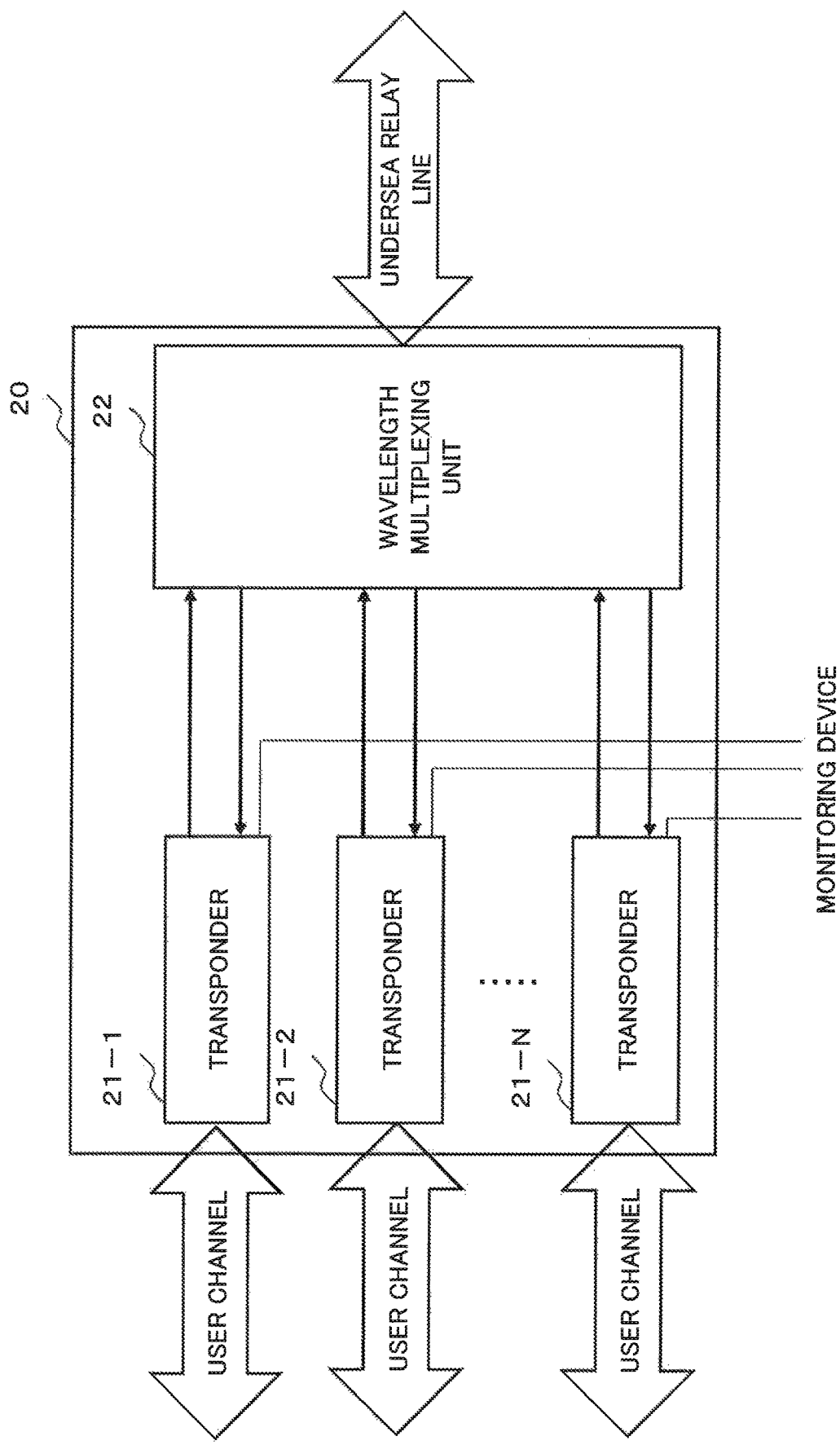
FIG. 3 is a diagram illustrating an overview of a configuration of a communication device according to the second example embodiment of the present invention.

Configurations of the first undersea terminal station device 11 and the second undersea terminal station device 12 are described. FIG. 3 is a block diagram illustrating an overview of a configuration of a communication device 20 used as the first undersea terminal station device 11 and the second undersea terminal station device 12.

The communication device 20 includes a transponder 21 and a wavelength multiplexing unit 22. The communication device 20 is a terminal station device which accommodates a plurality of user channels. N transponders 21 are provided, ranging from a transponder 21-1 to a transponder 21-N. N is an integer. Each transponder 21 is provided to transmit and receive an optical signal of an allocated wavelength by pairing with a transponder of a communication device opposed via the undersea relay line 15.

Figure 4:
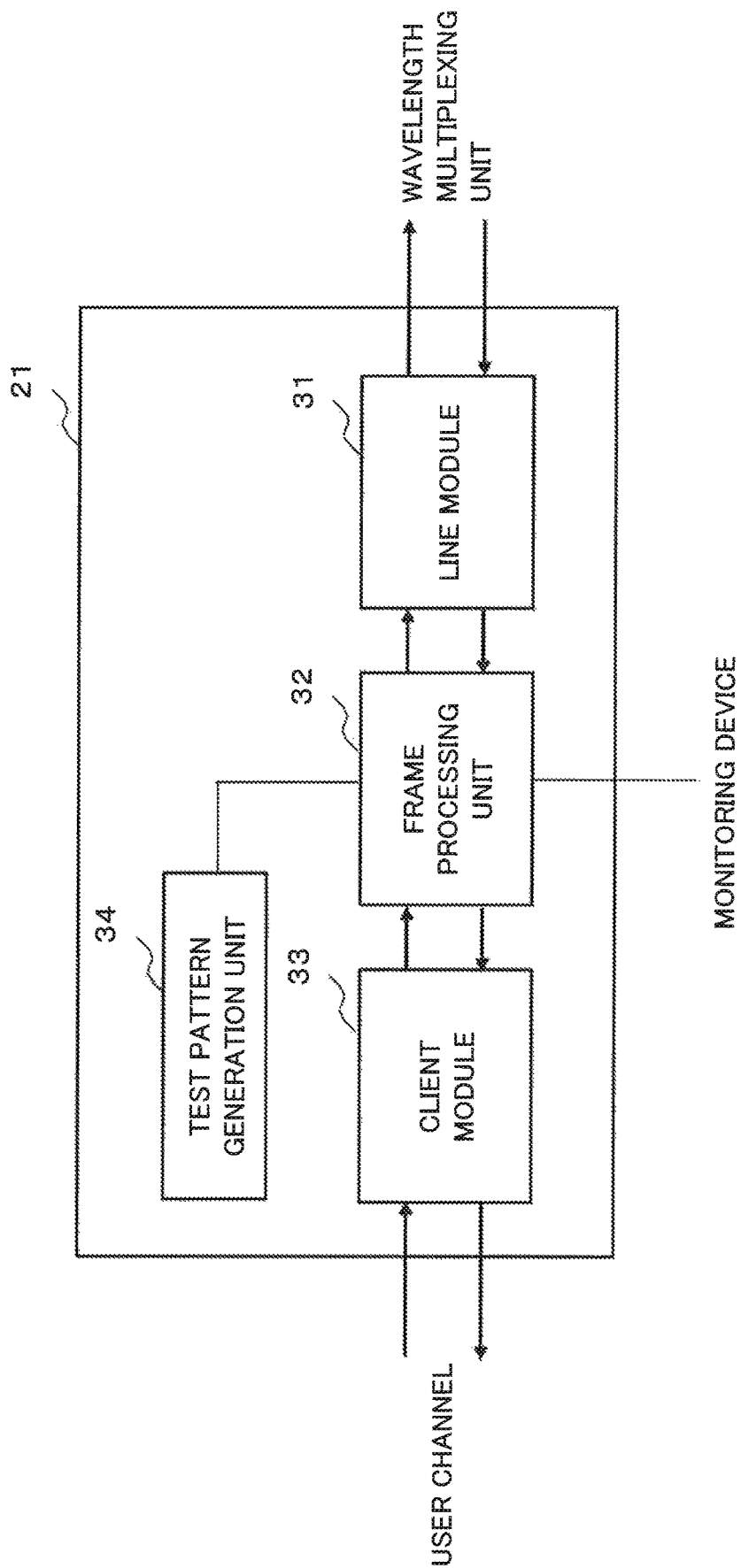
FIG. 4 is a diagram illustrating an overview of a configuration of a transponder according to the second example embodiment of the present invention.

A configuration of the transponder 21 is described. FIG. 4 is a block diagram illustrating an overview of a configuration of the transponder 21. The transponder 21 includes a line module 31, a frame processing unit 32, a client module 33, and a test pattern generation unit 34.

The line module 31 has a function of transmitting and receiving a WDM signal to and from the undersea relay line 15. The line module 31 includes a transmission unit and a receiving unit of an optical signal. The transmission unit includes a semiconductor laser which outputs an optical signal having a predetermined wavelength, and a modulation element. A predetermined wavelength is set for each transponder 21 on the basis of a wavelength design of the optical communication system. For example, a Mach-Zehnder type modulator is used for the modulation element. The transmission unit phase-modulates, with the modulation element, light output from the semiconductor laser on the basis of code data sent from the frame processing unit 32, and outputs the light to the wavelength multiplexing unit 22 as an optical signal. The receiving unit includes a photoelectric conversion element, and converts the optical signal input from the wavelength multiplexing unit 22 into an electric signal, and then outputs the electric signal to the frame processing unit 32. For example, a photodiode is used as the photoelectric conversion element.

Figure 5:
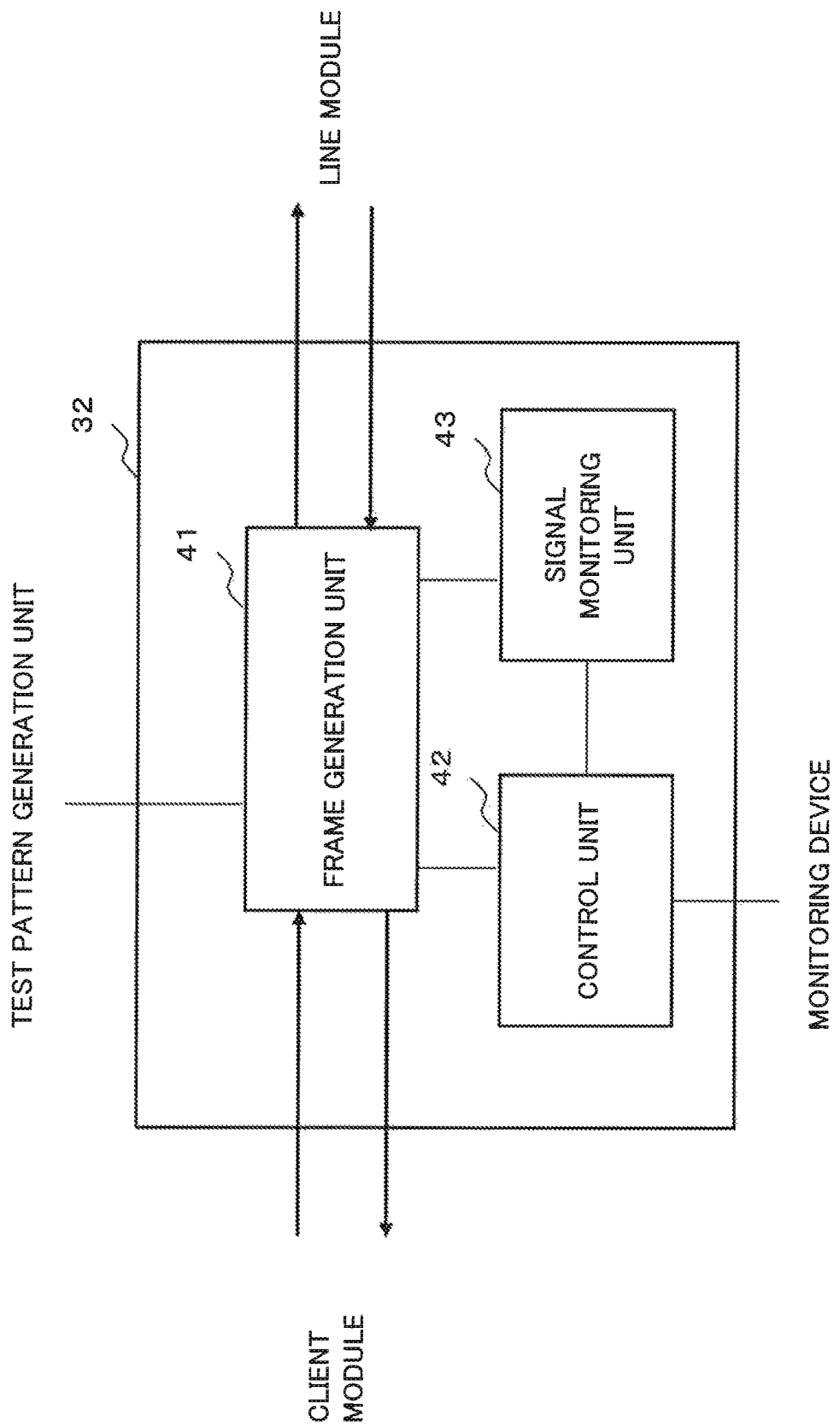
FIG. 5 is a diagram illustrating an overview of a configuration of a frame processing unit according to the second example embodiment of the present invention.

A configuration of the frame processing unit 32 is described. FIG. 5 is a block diagram illustrating an overview of a configuration of the frame processing unit 32. The frame processing unit 32 includes a frame generation unit 41, a control unit 42, and a signal monitoring unit 43. The frame processing unit 32 is configured by a plurality of semiconductor devices or a single semiconductor device. For example, a digital signal processor (DSP) or a field-programmable gate array (FPGA) is used as the semiconductor device.

The frame generation unit 41 converts data based on a user channel signal input from the client module 33 or data of a dummy pattern input from the test pattern generation unit 34, into code data for transfer via the undersea relay line 15. The dummy pattern is previously set as data having no meaning as information. The frame generation unit 41 selects either the data based on the user channel signal or the data of the dummy pattern under the control of the control unit 42, and converts the selected data into code data for transfer via the undersea relay line 15. The frame generation unit 41 outputs the converted code data to the line module 31.

The frame generation unit 41 has a function of adding, to an overhead region of a signal for transmission, failure detection information indicating that a failure of a received signal is detected, or failure recovery information indicating that the failure is eliminated, and then outputting the failure detection information or the failure recovery information to the line module 31. The frame generation unit 41 outputs the failure detection information or the failure recovery information to the line module 31 under the control of the control unit 42.

Furthermore, the frame generation unit 41 converts the code data input from the line module 31, into a format for transfer on the user channel 16 or the user channel 17, and outputs the converted data to the client module 33. Functions of the line module 31 and the frame generation unit 41 according to the present example embodiment correspond to the function of the communication means 1 according to the first example embodiment.

The control unit 42 has a function of controlling the operation of the frame generation unit 41. When the signal monitoring unit 43 detects a failure of a signal received from an opposed transponder, the control unit 42 controls the frame generation unit 41, and then transmits failure detection information to the opposed transponder. When the signal monitoring unit 43 detects that the failure of the signal received from the opposed transponder is eliminated, the control unit 42 controls the frame generation unit 41, and then transmits failure recovery information to the opposed transponder.

When the signal monitoring unit 43 detects that failures have occurred in the transfer of the optical signal and the reception in an opposed transponder, the control unit 42 switches a signal output to the line module 31 by the frame generation unit 41 from a user channel signal to a dummy pattern signal. When the signal monitoring unit 43 detects that failure recovery information is sent from an opposed transponder, the control unit 42 outputs information indicating that the failure is eliminated to the first monitoring device 13 or the second monitoring device 14.

When receiving an instruction to switch from the first monitoring device 13 or the second monitoring device 14 to the user channel signal, the control unit 42 switches a signal output to the line module 31 by the frame generation unit 41 from a dummy pattern signal to a user channel signal. In other words, when receiving, from the first monitoring device 13 or the second monitoring device 14, authentication regarding the switch from the dummy pattern to the actual data based on the user channel signal, the control unit 42 resumes transmission of the signal based on the actual data. In addition, the function in the control unit 42 according to the present example embodiment of switching from a dummy pattern signal to a user channel signal on the basis of authentication received from the first monitoring device 13 or the second monitoring device 14 corresponds to the function of the control means 3 according to the first example embodiment.

The signal monitoring unit 43 has a function of detecting a failure of an optical signal sent from a transponder of an opposed communication device via the undersea relay line 15. The signal monitoring unit 43 monitors signal processing in the frame generation unit 41, and detects a failure such as an interruption of an optical signal input or step out of a signal. The signal monitoring unit 43 outputs information indicating that a failure is detected, to the control unit 42.

The signal monitoring unit 43 monitors whether or not failure detection information or failure recovery information is added to an overhead region of a signal processed in the frame generation unit 41. When detecting the failure detection information or the failure recovery information, the signal monitoring unit 43 outputs information indicating the detection, to the control unit 42. Even when detecting that a failure has occurred on a transmission line of the optical signal such as the undersea relay line 15, the signal monitoring unit 43 outputs information indicating that the failure is detected, to the control unit 42. In addition, the function of the signal monitoring unit 43 according to the present example embodiment corresponds to the monitoring means 2 according to the first example embodiment.

The client module 33 has a function of transmitting and receiving a signal to and from the user channel 16 or the user channel 17. The client module 33 includes a transmission unit and a receiving unit of an optical signal. The transmission unit includes a semiconductor laser which outputs an optical signal having a predetermined wavelength, and a modulation element. The predetermined wavelength is previously set on the basis of a design of the user channel 16 or the user channel 17. The transmission unit modulates, with the modulation element, light output from the semiconductor laser on the basis of code data sent from the frame processing unit 32, and outputs the modulated light to the user channel 16 or the user channel 17. For example, a Mach-Zehnder type modulator is used for the modulation element. The transmission unit may output an optical signal by on/off modulation resulting from flashing of the semiconductor laser.

The receiving unit includes a photoelectric conversion element, and converts the optical signal input from the user channel 16 or the user channel 17 into an electric signal, and then outputs the electric signal to the frame processing unit 32. For example, a photodiode is used as the photoelectric conversion element. In the present example embodiment, a signal input from the user channel 16 or the user channel 17 for transfer on the undersea relay line 15 is referred to as a user channel signal.

The test pattern generation unit 34 has a function of generating data of a dummy pattern signal. The test pattern generation unit 34 generates data of a dummy pattern signal, and sends the generated data to the frame processing unit 32. The test pattern generation unit 34 is configured by use of a semiconductor device. Moreover, contents of data of a dummy pattern to be generated are previously set.

The wavelength multiplexing unit 22 has a function of multiplexing and separating an optical signal. The wavelength multiplexing unit 22 includes a demultiplexer and a multiplexer. The wavelength multiplexing unit 22 multiplexes a signal input from each transponder 21 in the multiplexer by wave synthesis, and outputs a multiplexed optical signal to the undersea relay line 15. Further, the wavelength multiplexing unit 22 demultiplexes the optical signal input from the undersea relay line 15, and outputs the demultiplexed optical signal to each transponder 21 corresponding to the wavelength. For example, arrayed waveguide grating (AWG) can be used for the demultiplexer and the multiplexer.

The first monitoring device 13 and the second monitoring device 14 have a function as a terminal device which monitors a communication state in an optical communication network, and controls communication. On receipt of information indicating that the failure is eliminated from the frame processing unit 32, the first monitoring device 13 and the second monitoring device 14 notify an operator of an inspection of communication equipment. The inspection of the communication equipment refers to, for example, checking whether or not an illegal interception device or cable is connected to the communication device 20 or the like. On receipt of an input indicating that there is not any abnormality as a result of the inspection, the first monitoring device 13 and the second monitoring device 14 send an instruction to switch from the dummy pattern signal to the user channel signal. In other words, the first monitoring device 13 and the second monitoring device 14 are devices which acquire an authentication by the operator regarding switching of a signal to be sent, from a dummy pattern to a signal based on actual data based on the user channel signal. In addition, the function of the control unit 42 of the communication device 20 which acquires authentication information via the first monitoring device 13 and the second monitoring device 14 corresponds to the function of the authentication means 4 according to the first example embodiment.

The undersea relay line 15 has a function as a transmission line of a WDM-scheme optical signal. The undersea relay line 15 is configured by an optical fiber and a relay device such as an amplifier that are laid undersea.

The user channel 16 and the user channel 17 are optical communication channels connecting the first undersea terminal station device 11 and the second undersea terminal station device 12 to other communication devices. The user channel 16 and the user channel 17 are each configured by an optical fiber, and a communication device such as a relay device. In the present example embodiment, a plurality of user channels 16 and user channels 17 are provided to correspond to the number of the transponders 21.

An operation of the optical communication system according to the present example embodiment is described. In the optical communication system according to the present example embodiment, at normal times, a WDM-scheme optical signal based on a user channel signal is transmitted and received between the first undersea terminal station device 11 and the second undersea terminal station device 12 via the undersea relay line 15.

Figure 6:
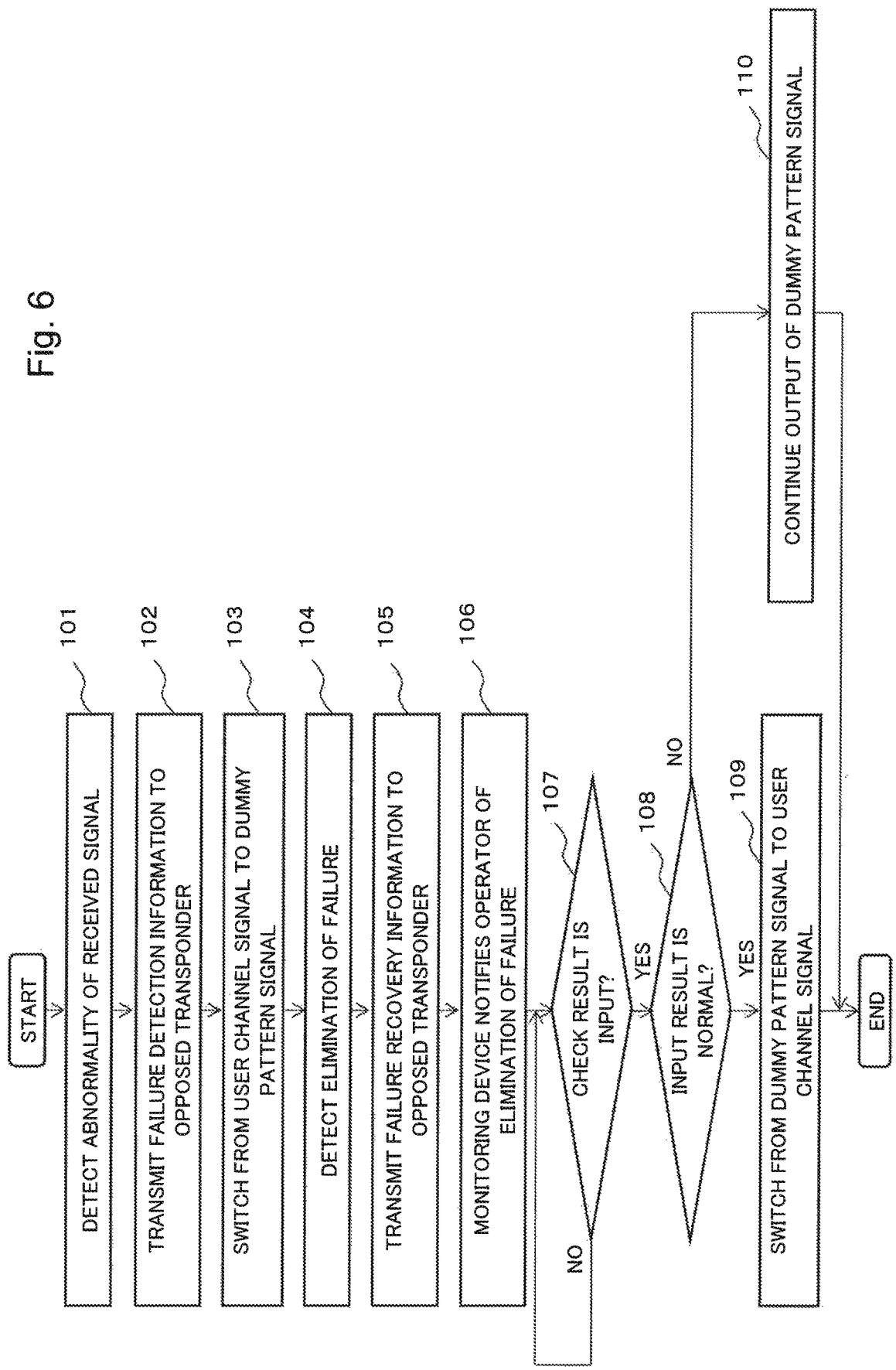
FIG. 6 is a diagram illustrating an overview of an operation flow according to the second example embodiment of the present invention.

Described is an operation in which in the optical communication system according to the present example embodiment, a failure occurs in transmission and reception of an optical signal, and when the failure is eliminated, the transmission and reception of the optical signal are resumed. FIG. 6 illustrates an overview of an operation flow in the case where in the optical communication system according to the present example embodiment, a failure occurs in transmission and reception of an optical signal, and when the failure is eliminated, the transmission and reception of the optical signal are resumed. In the following, as an example, a case is described that a failure occurs in transmission of an optical signal from the second undersea terminal station device 12 to the first undersea terminal station device 11.

In the transponder 21 of the first undersea terminal station device 11, the signal monitoring unit 43 of the frame processing unit 32 monitors a signal input to the frame generation unit 41 from the line module 31, and thus monitors whether or not a failure is present. When a failure occurs in transmission of an optical signal from the second undersea terminal station device 12 to the first undersea terminal station device 11, the signal monitoring unit 43 of the first undersea terminal station device 11 detects an abnormality of a received signal from an interruption or the like of input of a signal from the line module 31 side (step 101). By detecting the abnormality of the received signal, the frame processing unit 32 detects that a failure has occurred in the transfer of the optical signal from the second undersea terminal station device 12 to the first undersea terminal station device 11.

When detecting the failure, the signal monitoring unit 43 of the first undersea terminal station device 11 sends information indicating that the failure has occurred, to the control unit 42. When detecting that the failure has occurred, the control unit 42 controls the frame generation unit 41, and thus outputs information indicating that the failure is detected, to the line module 31 as failure detection information. Using an overhead region of a transmission signal, the frame generation unit 41 outputs code data of the failure detection information to the line module 31. The code data of the failure detection information output to the line module 31 are converted into an optical signal, and transmitted to the transponder 21 of the second undersea terminal station device 12 opposed via the undersea relay line 15 (step 102).

The data of the failure detection information input to the transponder 21 of the second undersea terminal station device 12 are input to the frame processing unit 32 via the line module 31. When the data of the failure detection information are input to the frame processing unit 32, the signal monitoring unit 43 detects that the failure detection information is received. When detecting the failure detection information, the signal monitoring unit 43 sends information indicating that the failure detection information is detected, to the control unit 42. Moreover, the signal monitoring unit 43 of the second undersea terminal station device 12 also sends failure detection information to the control unit 42 when detecting that a failure has occurred on a transmission line of an optical signal such as the undersea relay line 15.

On receipt of information indicating that the failure detection information is received, the control unit 42 controls the frame generation unit 41, and thus switches a signal output to the line module 31, from a user channel signal to a dummy pattern signal (step 103). In other words, the frame generation unit 41 stops the output, to the line module 31, of the signal based on the actual data input from the user channel 17, and outputs a dummy pattern signal to the line module 31. In the present example embodiment, data of a signal input to the transponder 21 from the user channel 16 and the user channel 17 as a user channel signal for transfer on the undersea relay line 15 are referred to as actual data.

The dummy pattern signal output to the line module 31 from the frame processing unit 32 of the second undersea terminal station device 12 is converted into an optical signal, and sent to the first undersea terminal station device 11 via the undersea relay line 15. Thus, even when a third party intercepts during the transfer of the optical signal, the third party is in a state of being able to obtain only the dummy pattern signal.

When detecting a failure, the control unit 42 of the first undersea terminal station device 11 and the second undersea terminal station device 12 outputs information indicating that the failure is detected, to the first monitoring device 13 and the second monitoring device 14, respectively. When the operator recognizing that the failure is detected via the first monitoring device 13 and the second monitoring device 14 performs a maintenance operation, a signal of a normal dummy pattern becomes input to the frame processing unit 32 of the first undersea terminal station device 11. When the signal of the normal dummy pattern is input, the signal monitoring unit 43 of the first undersea terminal station device 11 detects that the failure is eliminated (step 104).

When detecting that the failure is eliminated, the signal monitoring unit 43 of the first undersea terminal station device 11 sends information indicating that the failure is eliminated to the control unit 42. On receipt of the information indicating that the failure is eliminated, the control unit 42 controls the frame generation unit 41, and thus outputs the information indicating that the failure is eliminated to the line module 31 as failure recovery information. Using the overhead region, the frame generation unit 41 outputs code data indicating the failure recovery information to the line module 31.

Code data of the failure recovery information input to the line module 31 are converted into an optical signal, and transmitted to the transponder 21 of the second undersea terminal station device 12 opposed via the undersea relay line 15 (step 105). The failure recovery information input to the second undersea terminal station device 12 is input to the frame processing unit 32 of the transponder 21.

When the failure recovery information is input to the frame processing unit 32 of the second undersea terminal station device 12, the signal monitoring unit 43 detects that the failure recovery information is received, and sends information indicating a recovery from the failure to the control unit 42. On receipt of information indicating that the failure is eliminated, the control unit 42 outputs the information indicating that the failure is eliminated to the second monitoring device 14. On receipt of the information indicating that the failure is eliminated, the second monitoring device 14 notifies the operator that the failure is eliminated (step 106).

When the operator is notified that the failure is eliminated in step 106, the second monitoring device 14 checks whether or not a check result is input. When a check result is not input (No in step 107), the second monitoring device 14 waits until a check result is input.

The operator recognizing the elimination of the failure via the second monitoring device 14 checks communication equipment such as a communication device and a communication cable, and checks whether or not illegal communication interception is being performed by connection of an interception device, or the like. After checking whether or not illegal equipment for interception is present, the operator inputs a check result to the second monitoring device 14.

When the check result is input (Yes in step 107), the second monitoring device 14 checks whether or not the input check result indicates a normal state, i.e., a state where illegal equipment for interception is not present.

When the input check result is a result indicating a normal state (Yes in step 108), the second monitoring device 14 sends, to the control unit 42 of the second undersea terminal station device 12, an instruction to return to the transmission of the actual data based on the input user channel signal.

On receipt of the instruction to return to the transmission of the actual data, the control unit 42 controls the frame generation unit 41, thus stops the output of the dummy pattern signal to the line module 31, and starts output of a signal based on actual data of a user channel signal (step 109). When switching is made to the output of the actual data of the user channel signal input from the client module 33, transmission and reception of a normal optical signal based on the user channel signal between the first undersea terminal station device 11 and the second undersea terminal station device 12 are resumed.

When the check result input by the operator is a result indicating that illegal equipment for interception is present and there is an abnormality (No in step 108), the output of the dummy pattern signal from the frame generation unit 41 to the line module 31 is continued (step 110). By continuing the output of the dummy pattern signal, it is possible to perform removal of the interception device, or the like while avoiding interception of the actual data of the user channel signal by the third party performing interception.

Figure 7:
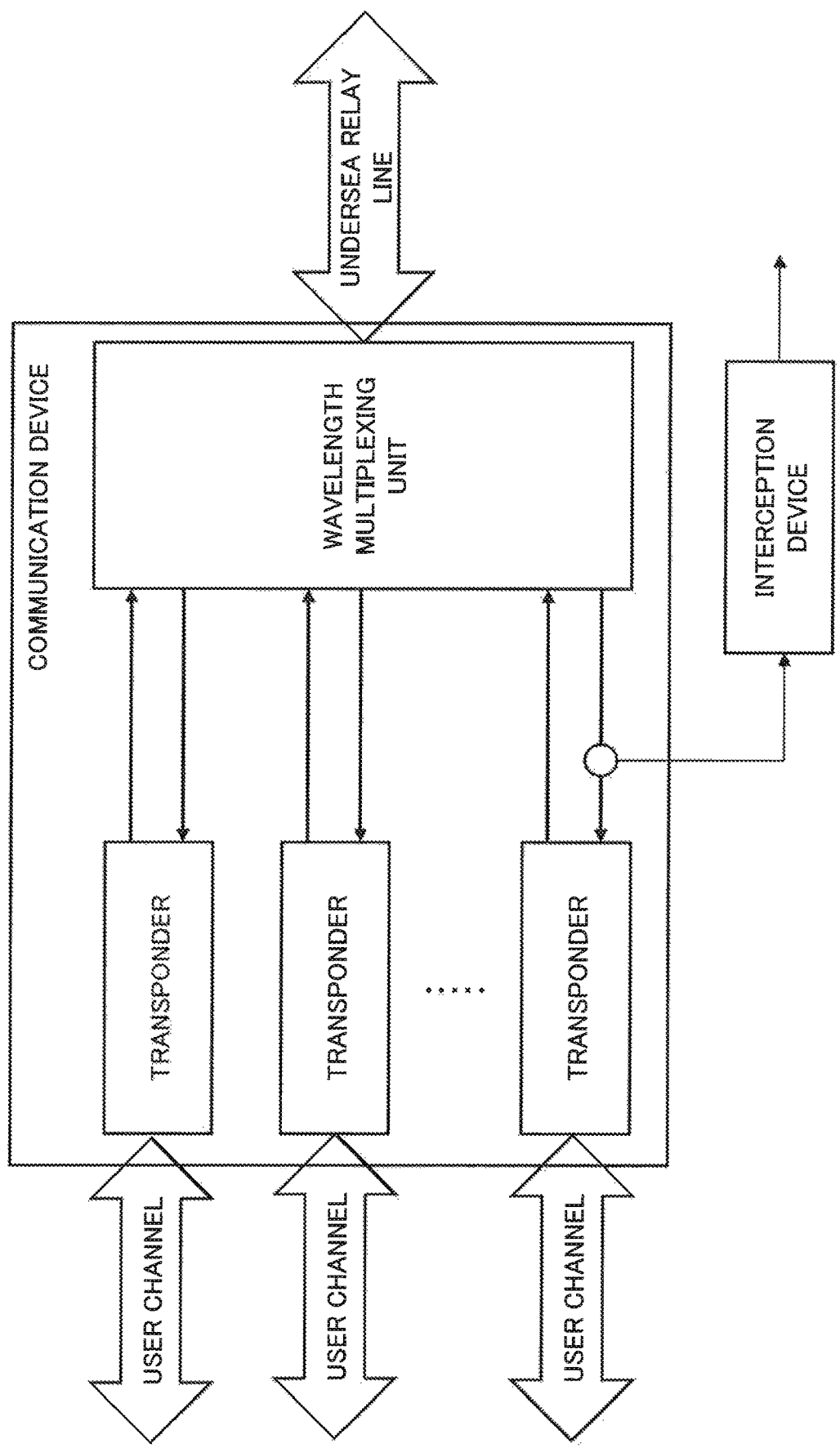
FIG. 7 is a diagram illustrating an overview of an example of a configuration of a communication device compared with the present invention.

FIG. 7 illustrates an example in which an optical signal input from an undersea relay line is branched by an optical coupler or the like between a wavelength multiplexing unit and a transponder after being multiplexed, and input to an interception device placed by an interceptor. Thus, when an interception device is mounted, input of a received signal to the transponder is interrupted due to mounting of an optical coupler or the like. In such a case, when actual data based on a user channel signal are being transmitted at a time of resumption of input of the optical signal to the transponder, there is concern that data are intercepted by a third party who has mounted the interception device. The optical communication system according to the present example embodiment notifies a transmission-side transponder when an input signal to a reception-side transponder is interrupted, and produces a state where a dummy pattern signal is being transmitted when communication is resumed by transmitting the dummy pattern signal. Thus, immediately after the input of the received signal to the transponder is interrupted due to mounting of an optical coupler or the like, the dummy pattern signal alone is transmitted. Therefore, there is not concern that the actual data based on the user channel signal are intercepted by the third party who has mounted the interception device.

Figure 8:
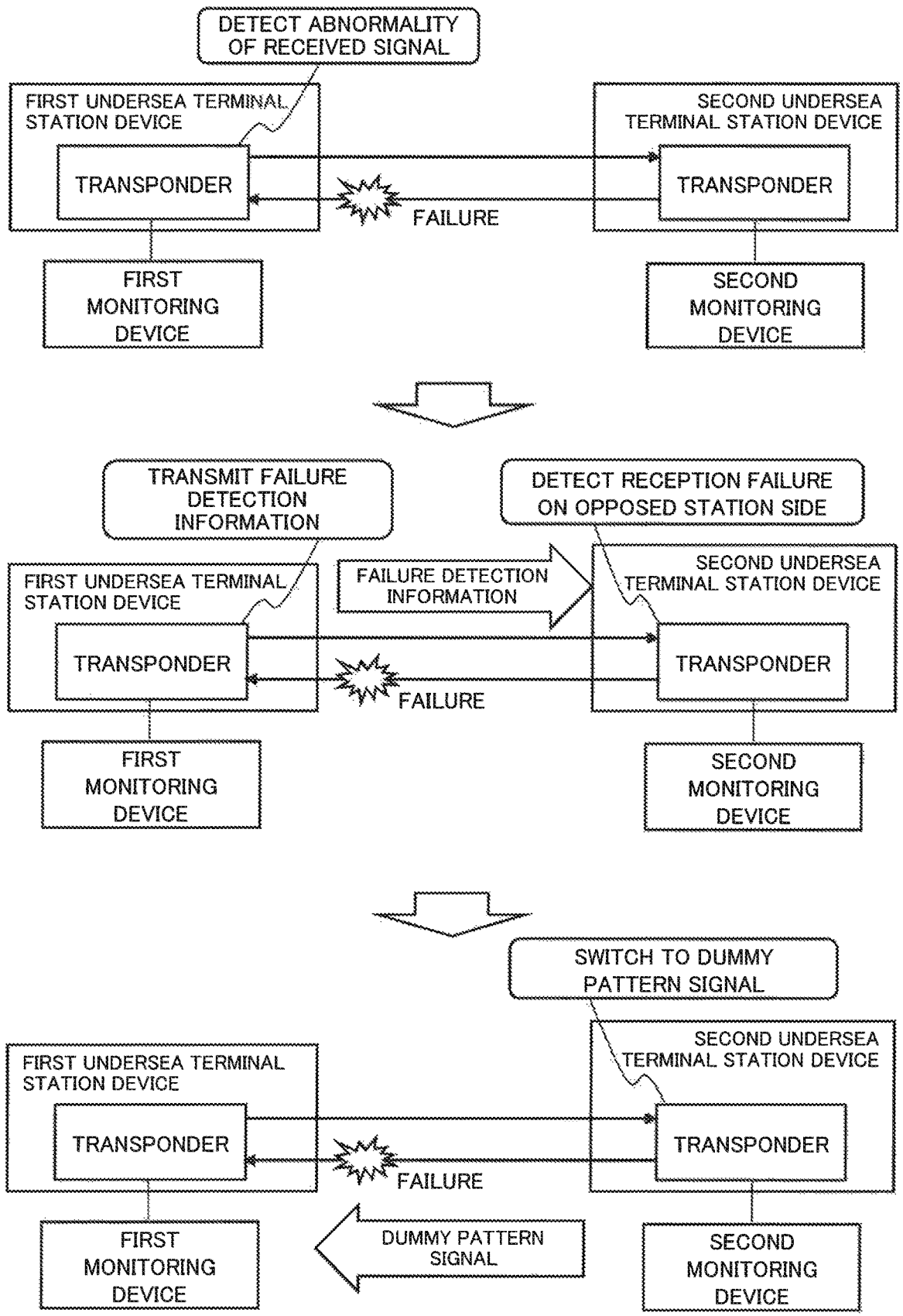
FIG. 8 is a diagram schematically illustrating states of transmission and reception of a signal between respective devices according to the second example embodiment of the present invention.
Figure 9:
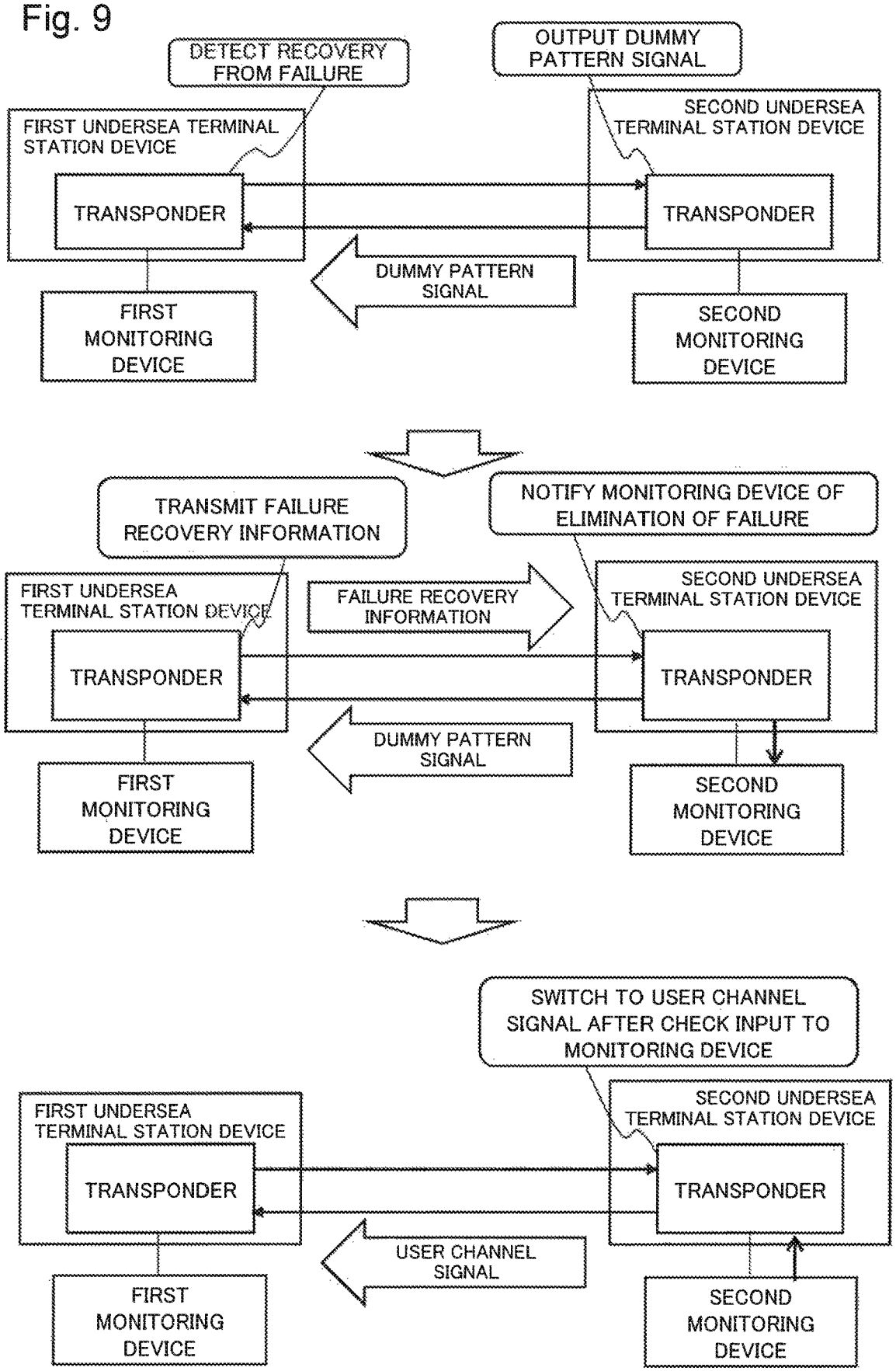
FIG. 9 is a diagram schematically illustrating states of transmission and reception of a signal between respective devices according to the second example embodiment of the present invention.

FIGS. 8 and 9 schematically illustrate an operation of each device and an example of transmitted and received data when a failure occurs in the optical communication system according to the present example embodiment. A diagram at a topmost stage of FIG. 8 illustrates a case where a failure occurs on a transmission line of an optical signal transmitted from the second undersea terminal station device 12 to the first undersea terminal station device 11, and the transponder 21 of the first undersea terminal station device 11 detects an abnormality of a received signal. A second diagram from the top of FIG. 8 illustrates a case where the transponder 21 of the first undersea terminal station device 11 detecting the failure transmits failure detection information to the transponder 21 of the second undersea terminal station device 12 opposed via the undersea relay line 15. The second diagram from the top of FIG. 8 also illustrates a case where the transponder 21 of the second undersea terminal station device 12 detects that a reception failure has occurred on the opposed first undersea terminal station device 11 side, by receiving the failure detection information. A diagram at a bottommost stage of FIG. 8 illustrates a case where the transponder 21 of the second undersea terminal station device 12 which detects that the reception failure has occurred on the opposed terminal station device side starts transmission of a dummy pattern signal.

A diagram at a topmost stage of FIG. 9 illustrates an example of a case where a cause of the failure is removed by a maintenance operation, and the dummy pattern signal transmitted by the transponder 21 of the second undersea terminal station device 12 starts reaching the transponder 21 of the first undersea terminal station device 11. The transponder 21 of the first undersea terminal station device 11 detects that the failure is eliminated, by normally receiving the dummy pattern signal.

A second diagram from the top of FIG. 9 illustrates a case where the transponder 21 of the first undersea terminal station device 11 detecting the elimination of the failure transmits failure recovery information to the transponder 21 of the second undersea terminal station device 12 opposed via the undersea relay line 15. Moreover, in the second diagram from the top of FIG. 9, the transponder 21 of the second undersea terminal station device 12 receiving the failure recovery information notifies the second monitoring device 14 of information indicating that the failure is eliminated. In this instance, the transponder 21 of the second undersea terminal station device 12 continues the transmission of the dummy pattern signal.

A diagram at a bottommost stage of FIG. 9 illustrates a case where the operator checks that interception or the like is not present and that an abnormality is not present, and inputs a check result to the second monitoring device 14, and an instruction to switch to a user channel signal is provided. The transponder 21 of the second undersea terminal station device 12 receiving the instruction to switch to the user channel signal resumes the transmission of the user channel signal. Thus, the transmission of the dummy pattern signal is continued when the failure is eliminated, and switching is made to the user channel signal after the operator authenticates switching to the actual data. Thereby, it is possible to avoid interception of communication by a third party immediately after the elimination of the failure.

In the optical communication system according to the present example embodiment, when the reception-side transponder 21 detects an interruption or the like of input of a signal, the reception-side transponder 21 transmits failure detection information to the transmission-source transponder 21 opposed via the undersea relay line 15. When receiving the failure detection information or when detecting a failure of transfer of an optical signal by the local device, the transmission-source transponder 21 switches a signal to be transmitted via the undersea relay line 15, from actual data based on a user channel signal to a signal based on a dummy pattern. Thus, when an interruption or the like of a signal is caused in the case where a third party intending to illegally intercept communication mounts an interception device, a dummy pattern signal becomes transferred via the undersea relay line 15.

In the optical communication system according to the present example embodiment, even after a failure recovery signal indicating that the failure is eliminated is sent from the reception-side transponder 21, the transmission-source transponder 21 continues the transmission of the signal based on the dummy pattern. Moreover, the transmission-source transponder 21 receives an instruction to switch to the user channel signal from the monitoring device after the elimination of the failure, and then switches a signal to be transmitted via the undersea relay line 15, from the dummy pattern signal to a signal based on the user channel signal. Thus, after the operator checks that communication is not intercepted, and authenticates transmission of a user channel signal being actual data, transmission of the actual data is started. Therefore, communication based on the actual data is not intercepted by a third party intending to illegally intercept communication. As a result, the optical communication system according to the present example embodiment can more certainly prevent leakage of information when an interception device or the like is connected.

Third Example Embodiment

Figure 10:
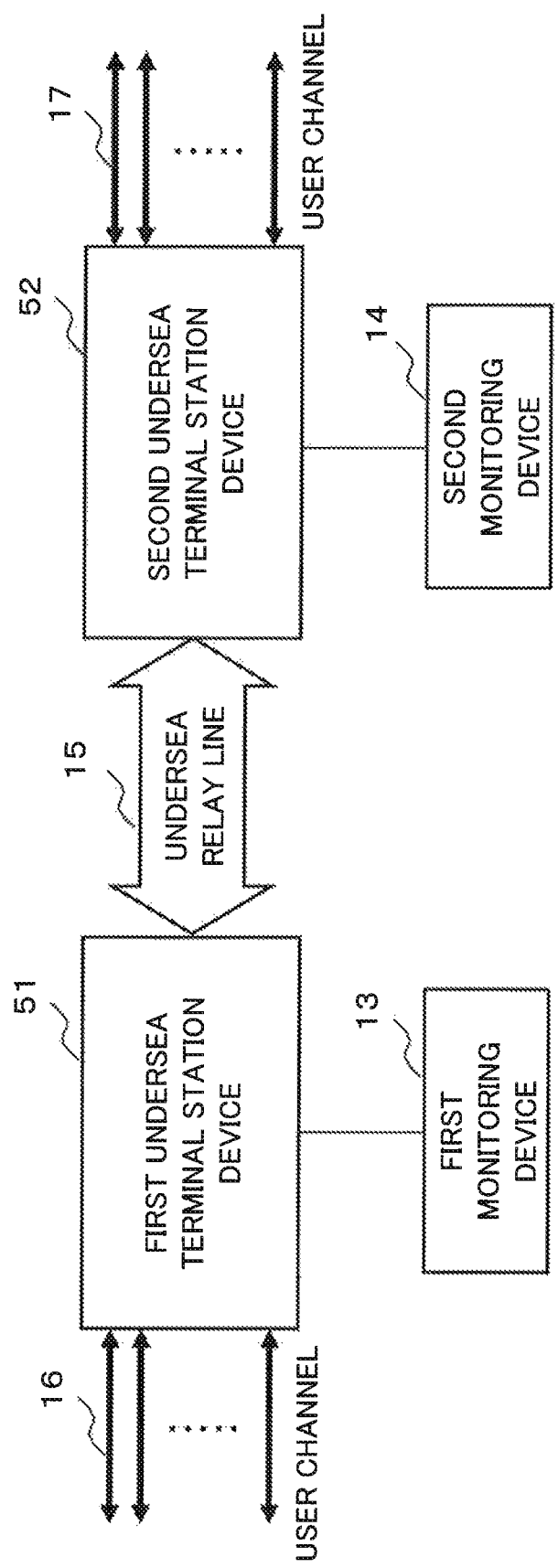
FIG. 10 is a diagram illustrating an overview of a configuration according to a third example embodiment of the present invention.

A third example embodiment of the present invention is described in detail with reference to the drawings. FIG. 10 illustrates an overview of a configuration of an optical communication system according to the present example embodiment. In the optical communication system according to the second example embodiment, an operator checks whether or not interception equipment is present in a state where a signal based on a dummy pattern is transmitted when a failure is eliminated, the operator authenticates switching, and switching is thereby made to transmission of a signal based on actual data. The optical communication system according to the present example embodiment is characterized by measuring optical power when an optical signal is received, and determining whether or not to switch to the actual data from the dummy pattern, on the basis of a difference of optical powers of received signals before and after the occurrence of the failure.

The optical communication system according to the present example embodiment includes a first undersea terminal station device 51, a second undersea terminal station device 52, a first monitoring device 13, a second monitoring device 14, and an undersea relay line 15. The first undersea terminal station device 51 and the second undersea terminal station device 52 in the optical communication system according to the present example embodiment are connected to each other via the undersea relay line 15. The first undersea terminal station device 51 is further connected to a plurality of user channels 16. Moreover, the second undersea terminal station device 52 is further connected to a plurality of user channels 17. As in the second example embodiment, the optical communication system according to the present example embodiment is an undersea cable system which transmits and receives a WDM-scheme optical signal between the first undersea terminal station device 51 and the second undersea terminal station device 52 via the undersea relay line 15. The configurations and functions of the first monitoring device 13, the second monitoring device 14, the undersea relay line 15, the user channel 16, and the user channel 17 according to the present example embodiment are similar to those of the parts having the same names according to the second example embodiment.

Figure 11:
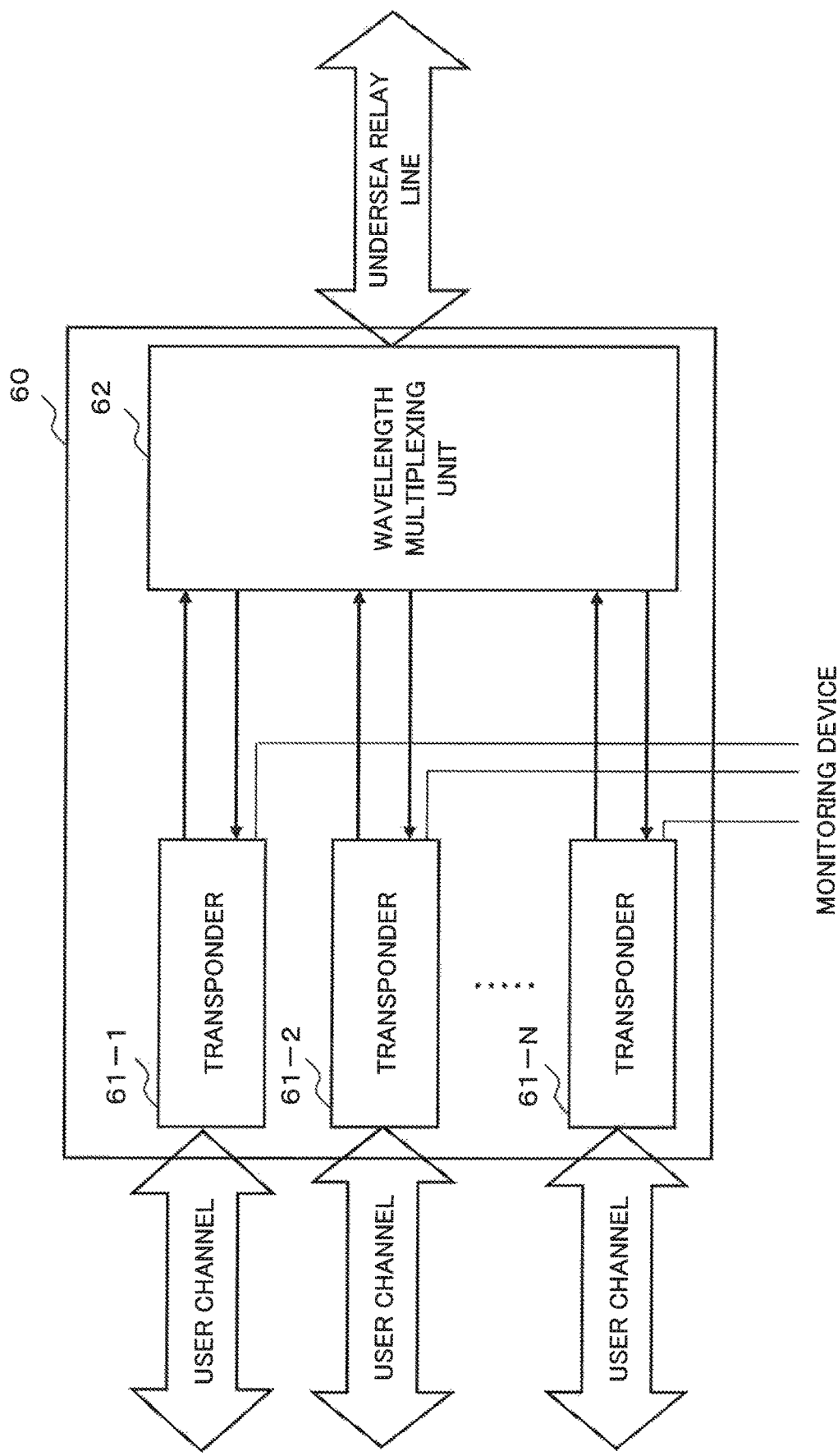
FIG. 11 is a diagram illustrating an overview of a configuration of a communication device according to the third example embodiment of the present invention.

The configurations of the first undersea terminal station device 51 and the second undersea terminal station device 52 are described. FIG. 11 is a block diagram illustrating an overview of a configuration of a communication device 60 used as the first undersea terminal station device 51 and the second undersea terminal station device 52. The communication device 60 includes a transponder 61 and a wavelength multiplexing unit 62. N transponders 61 are provided, ranging from a transponder 61-1 to a transponder 61-N. N is an integer.

Figure 12:
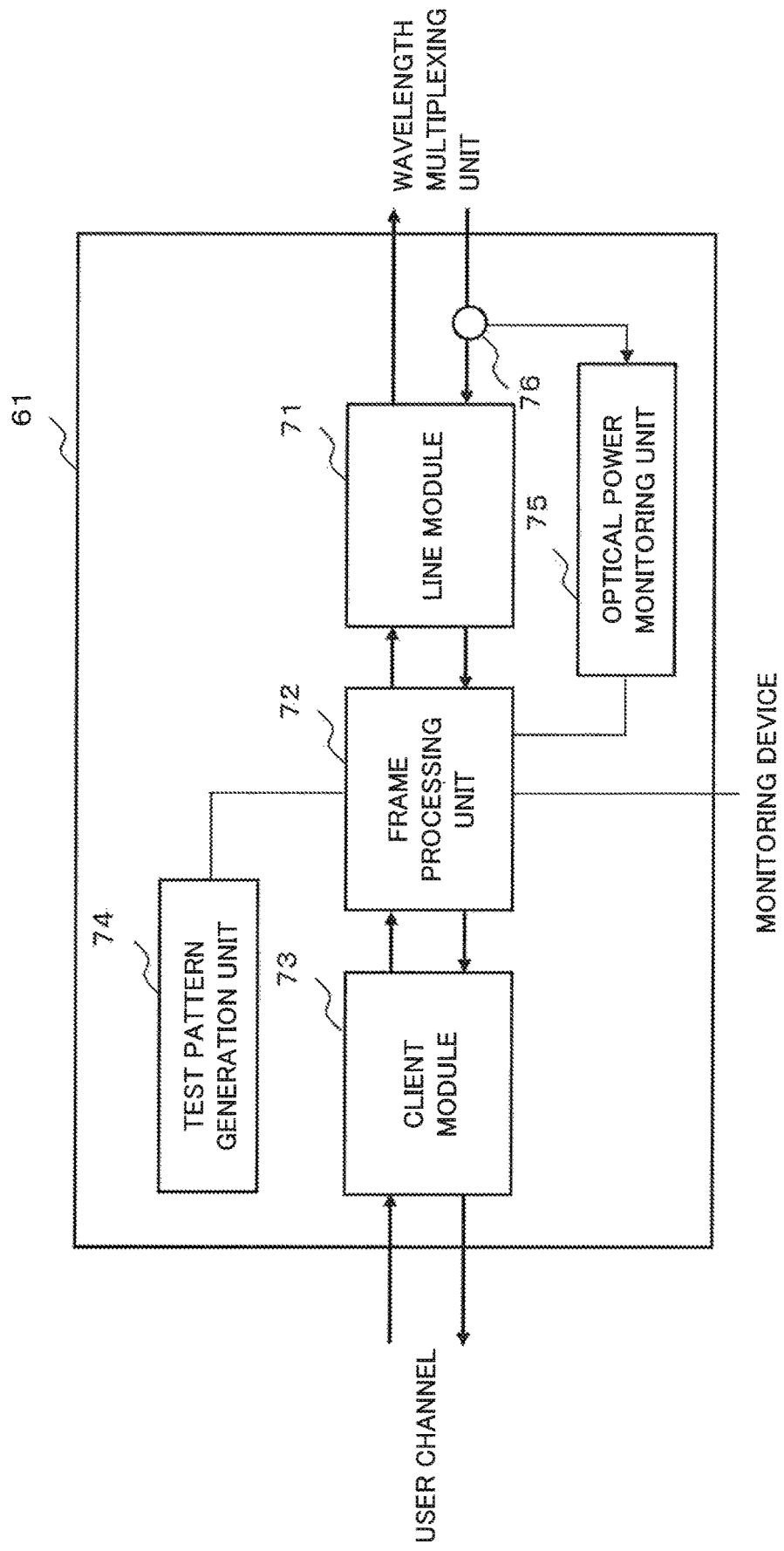
FIG. 12 is a diagram illustrating an overview of a configuration of a transponder according to the third example embodiment of the present invention.

A configuration of the transponder 61 is described. FIG. 12 is a block diagram illustrating an overview of the configuration of the transponder 61. The transponder 61 includes a line module 71, a frame processing unit 72, a client module 73, a test pattern generation unit 74, an optical power monitoring unit 75, and a branching unit 76. The configurations and functions of the line module 71, the client module 73, and the test pattern generation unit 74 according to the present example embodiment are similar to those of the parts having the same names in the second example embodiment.

Figure 13:
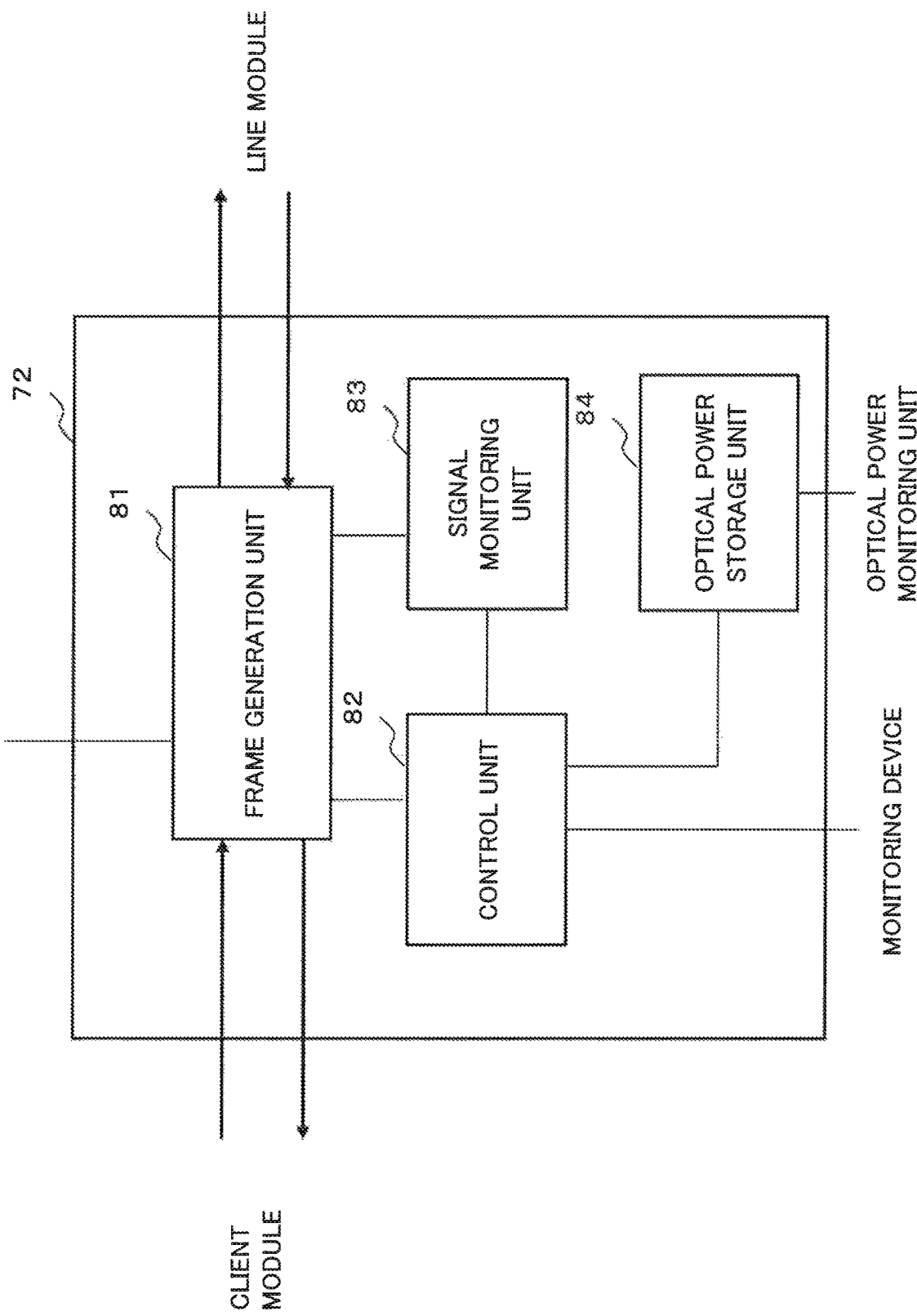
FIG. 13 is a diagram illustrating an overview of a configuration of a frame processing unit according to the third example embodiment of the present invention.

A configuration of the frame processing unit 72 is described. FIG. 13 is a block diagram illustrating an overview of the configuration of the frame processing unit 72. The frame processing unit 72 includes a frame generation unit 81, a control unit 82, a signal monitoring unit 83, and an optical power storage unit 84. The frame processing unit 72 is configured by a plurality of semiconductor devices or a single semiconductor device. For example, a digital signal processor (DSP) or a field-programmable gate array (FPGA) is used as the semiconductor device.

The frame generation unit 81 has a function similar to that of the frame generation unit 41 according to the second example embodiment. The frame generation unit 81 has a function of adding information about a difference of optical powers before and after occurrence of a failure of a received signal to failure recovery information when outputting the failure recovery information under the control of the control unit 82.

The control unit 82 has a function similar to that of the control unit 42 according to the second example embodiment. Moreover, the control unit 82 has a function of calculating a difference of optical powers of received signals before and after occurrence of a failure, and transmitting information about the difference of optical powers to an opposed transponder by controlling the frame generation unit 81. When the signal monitoring unit 83 detects that the failure of the received signal is eliminated, the control unit 82 calculates a difference of optical powers before and after the occurrence of the failure, on the basis of the information about the optical powers stored in the optical power storage unit 84. The control unit 82 sends, to the frame generation unit 81, the information about the optical powers before and after the occurrence of the failure, together with an instruction to transmit failure recovery information.

Furthermore, the control unit 82 has a function of determining whether or not there is an abnormality such as mounting of an interception device, on the basis of a difference of optical powers between a time of a normal operation before the occurrence of the failure of the received signal and a time of recovery from the failure. When receiving, from the signal monitoring unit 83, the failure recovery information and the information about the difference of optical powers that are sent from the opposed transponder, the control unit 82 compares the difference of optical powers with a predetermined standard.

When the difference of optical powers before and after the occurrence of the failure is smaller than the predetermined standard, the control unit 82 determines that the optical signal is not intercepted. When determining that the optical signal is not intercepted, the control unit 82 switches a signal output to the line module 71 from a dummy pattern to a signal based on actual data of a user channel signal, by controlling the frame generation unit 81. The predetermined standard is set, for example, in such a way that a difference of optical powers before and after occurrence of a failure is 1 dBm or less.

When information is intercepted by branching an optical signal, optical power of the branched optical signal needs to be at such a level that the signal can be differentiated from noise. Thus, when an interception device or the like is mounted, optical power of an input optical signal is lower. In other words, when an interception device or the like is mounted, optical power measured after the elimination of the failure is lower than optical power measured before the occurrence of the failure. Therefore, it is possible to determine whether or not an interception device is mounted, on the basis of a difference of optical powers before the occurrence of the failure and after the elimination of the failure. On the other hand, when optical power is only measured, optical power of the optical signal branched to the optical power monitoring unit 75 side in the branching unit 76 can be lower. Therefore, optical power of the optical signal input to the line module 71 side can be kept high. Consequently, quality deterioration of the optical signal input to the line module 71 side resulting from the measurement of the optical power can be suppressed.

When a difference of optical powers before and after occurrence of a failure is greater than the predetermined standard, the control unit 82 determines that the optical signal is branched by an interception device or the like, and outputs information indicating that there is a possibility of interception to the first monitoring device 13 or the second monitoring device 14. When a difference of optical powers before and after occurrence of a failure is greater than the predetermined standard, the control unit 82 does not automatically switch from a dummy pattern signal to a signal of a user channel. When the control unit 82 receives, from the first monitoring device 13 or the second monitoring device 14, an instruction to switch to a user channel signal, the frame generation unit 81 switches a signal output to the line module 71 from a dummy pattern signal to a user channel signal.

The signal monitoring unit 83 has a function similar to that of the signal monitoring unit 43 according to the second example embodiment. Moreover, when detecting that failure recovery information is sent from an opposed transponder, the signal monitoring unit 83 sends, to the control unit 82, the information about the difference of optical powers added to the failure recovery information, together with the failure recovery information.

The optical power storage unit 84 has a function of saving information about optical power input from the optical power monitoring unit 75. The information about optical power input from the optical power monitoring unit 75 is a value of the optical power of the optical signal sent to the line module 71 from the wavelength multiplexing unit 62.

The optical power monitoring unit 75 has a function of measuring the optical power of the optical signal branched by the branching unit 76. The optical power monitoring unit 75 includes a photodiode, and converts the optical signal into an electric signal. The optical power monitoring unit 75 calculates optical power of the optical signal sent from the wavelength multiplexing unit 62 on the basis of the electric signal, and outputs a value of the optical power to the optical power storage unit 84 of the frame processing unit 72. The optical power monitoring unit 75 previously saves a relation between optical power detected by the photodiode and the optical power of the optical signal sent from the wavelength multiplexing unit 62. The optical power monitoring unit 75 according to the present example embodiment outputs an average value of optical power for a predetermined time to the optical power storage unit 84 of the frame processing unit 72. The predetermined time is previously set.

The branching unit 76 has a function of branching the optical signal sent from the wavelength multiplexing unit 62 in such a way that the optical signal is input to the line module 71 and the optical power monitoring unit 75. For example, an optical coupler can be used for the branching unit 76.

An operation of the optical communication system according to the present example embodiment is described. In the optical communication system according to the present example embodiment, at normal times, a WDM-scheme optical signal based on a user channel signal is transmitted and received between the first undersea terminal station device 51 and the second undersea terminal station device 52 via the undersea relay line 15.

Figure 14:
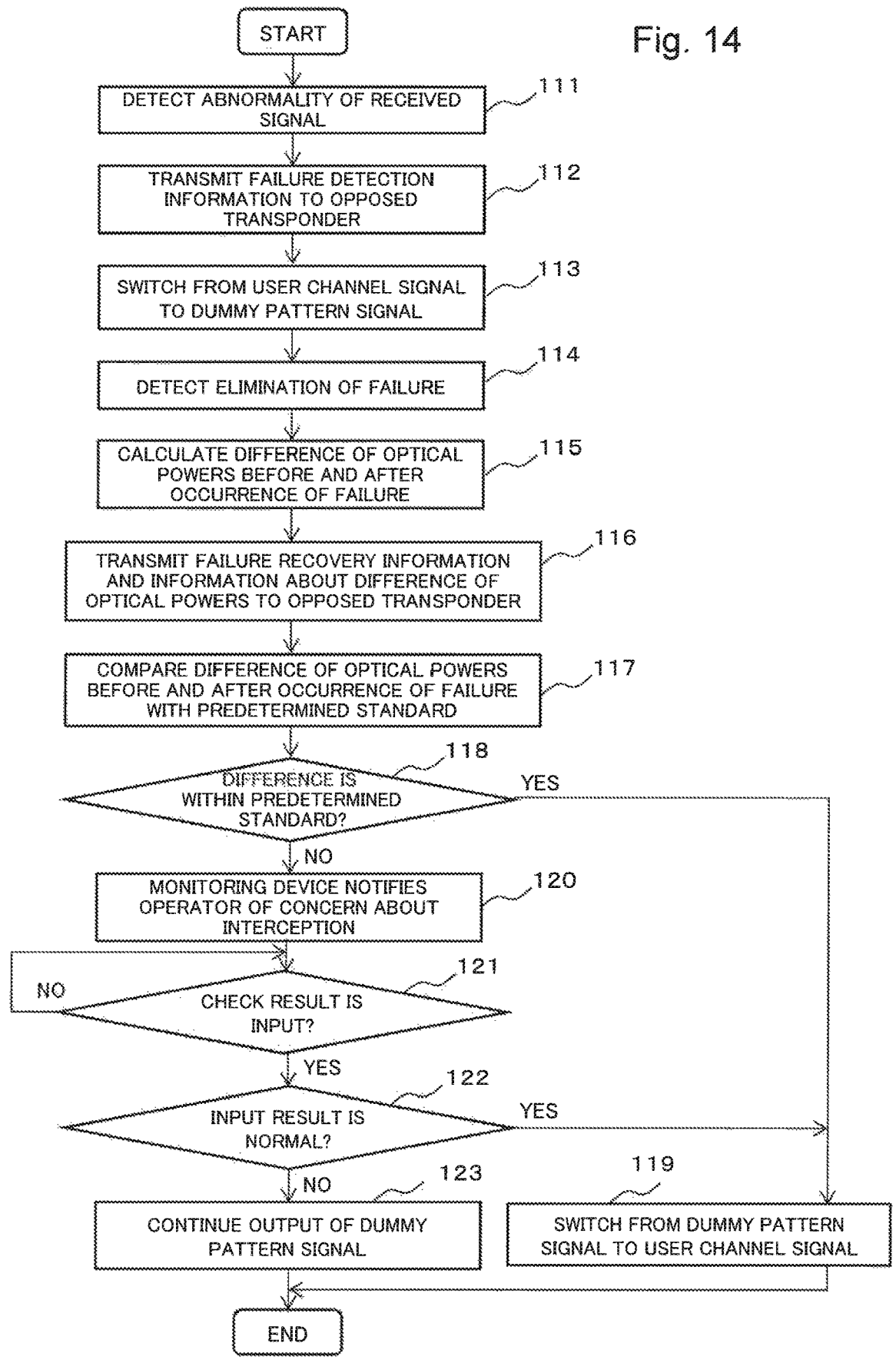
FIG. 14 is a diagram illustrating an overview of an operation flow according to the third example embodiment of the present invention.

Described is an operation in which in the optical communication system according to the present example embodiment, a failure occurs in transmission and reception of an optical signal, and when the failure is eliminated, the transmission and reception of the optical signal are resumed. FIG. 14 illustrates an overview of an operation flow in the case where in the optical communication system according to the present example embodiment, a failure occurs in transmission and reception of an optical signal, and when the failure is eliminated, the transmission and reception of the optical signal are resumed. In the following, as an example, a case is described that a failure occurs in transmission of an optical signal from the second undersea terminal station device 52 to the first undersea terminal station device 51.

In the transponder 61 of the first undersea terminal station device 51, the signal monitoring unit 83 of the frame processing unit 72 monitors a signal input from the line module 71, and monitors whether or not a failure is present. When a failure occurs in transmission of an optical signal from the second undersea terminal station device 52 to the first undersea terminal station device 51, the signal monitoring unit 83 of the frame processing unit 72 detects an abnormality of a received signal such as an interruption of input of a signal from the line module 71 side (step 111). By detecting the abnormality of the received signal, the frame processing unit 72 detects that a failure has occurred in the transfer of the optical signal from the second undersea terminal station device 52 to the first undersea terminal station device 51.

When detecting the failure, the signal monitoring unit 83 of the first undersea terminal station device 51 sends information indicating that the failure has occurred, to the control unit 82. When detecting that the failure has occurred, the control unit 82 controls the frame generation unit 81, and thus outputs information indicating that the failure is detected, to the line module 71 as failure detection information. Using an overhead region of a transmission signal, the frame generation unit 81 outputs code data of the failure detection information to the line module 71. The code data of the failure detection information output to the line module 71 are converted into an optical signal, and transmitted to the transponder 61 of the second undersea terminal station device 52 opposed via the undersea relay line 15 (step 112).

The data of the failure detection information input to the transponder 61 of the second undersea terminal station device 52 are input to the frame processing unit 72 via the line module 71. When the data of the failure detection information are input to the frame processing unit 72, the signal monitoring unit 83 detects that the failure detection information is received. When detecting the failure detection information, the signal monitoring unit 83 sends, to the control unit 82, information indicating that the failure detection information is detected. Moreover, the signal monitoring unit 83 of the second undersea terminal station device 52 also sends the failure detection information to the control unit 82 when detecting that a failure has occurred on a transmission line of an optical signal such as the undersea relay line 15.

On receipt of the information indicating that the failure detection information is received, the control unit 82 controls the frame generation unit 81, and thus switches a signal output to the line module 71 from a user channel signal to a dummy pattern signal (step 113).

The dummy pattern signal output to the line module 71 from the frame processing unit 72 of the second undersea terminal station device 52 is converted into an optical signal, and sent to the first undersea terminal station device 51 via the undersea relay line 15.

When detecting a failure, the control unit 82 of the first undersea terminal station device 51 and the second undersea terminal station device 52 outputs information indicating that the failure is detected, to the first monitoring device 13 and the second monitoring device 14, respectively. When the operator recognizing that the failure is detected via the first monitoring device 13 and the second monitoring device 14 performs a maintenance operation, a signal of a normal dummy pattern becomes input to the frame processing unit 72 of the first undersea terminal station device 51. When the signal of the normal dummy pattern is input, the signal monitoring unit 83 of the first undersea terminal station device 51 detects that the failure is eliminated (step 114).

When detecting that the failure is eliminated, the signal monitoring unit 83 of the first undersea terminal station device 51 sends information indicating that the failure is eliminated to the control unit 82. When detecting that the failure is eliminated, the control unit 82 calculates a difference of optical powers before and after the occurrence of the failure, i.e., before the occurrence of the failure and after the elimination of the failure (step 115). After calculating the difference of optical powers before and after the occurrence of the failure, the control unit 82 of the first undersea terminal station device 51 controls the frame generation unit 81, and thus outputs, to the line module 71, failure recovery information and information about the difference of optical powers before and after the occurrence of the failure. Using an overhead region, the frame generation unit 81 outputs, to the line module 71, code data based on the failure recovery information and the information about the difference of optical powers before and after the occurrence of the failure.

The failure recovery information and the information about the difference of optical powers before and after the occurrence of the failure input to the line module 71 of the first undersea terminal station device 51 are converted into an optical signal, and transmitted to the second undersea terminal station device 52 opposed via the undersea relay line 15 (step 116). The failure recovery information and the like input to the second undersea terminal station device 52 are input to the frame processing unit 72 of the transponder 61.

The failure recovery information and the information about the difference of optical powers before and after the occurrence input to the frame processing unit 72 of the second undersea terminal station device 52 are input to the frame generation unit 81. When failure recovery information and the information about the difference of optical powers before and after the occurrence are input to the frame generation unit 81, the signal monitoring unit 83 sends, to the control unit 82, information indicating that the failure is eliminated, and the information about the difference of optical powers before and after the occurrence of the failure.

On receipt of the information indicating that the failure is eliminated, and the information about the difference of optical powers before and after the occurrence of the failure, the control unit 82 compares the difference of optical powers before and after the occurrence of the failure, and determines whether or not the difference of optical powers is within the predetermined standard (step 117).

When the difference of optical powers before and after the occurrence of the failure is within the predetermined standard (Yes in step 118), the control unit 82 of the second undersea terminal station device 52 determines that the failure is eliminated in a normal state without mounting of an interception device, or the like. When determining that the failure is eliminated in a normal state, the control unit 82 controls the frame generation unit 81, thus stops the output of the dummy pattern signal to the line module 71, and switches to output of a signal based on a user channel signal (step 119).

When switching is made to the output of a signal based on actual data of the user channel signal, transmission and reception of a normal optical signal based on the user channel signal between the first undersea terminal station device 51 and the second undersea terminal station device 52 are resumed.

When the difference of optical powers before and after the occurrence of the failure is greater than the predetermined standard (NNo in step 118), the control unit 82 of the second undersea terminal station device 52 determines that there is concern that interception by mounting of an interception device, or the like is performed. This is because when the difference of optical powers is greater than the predetermined standard, there is a possibility that some modification such as mounting of an optical coupler for branching is made to communication equipment.

When determining that there is concern about mounting of an interception device, or the like being performed, the control unit 82 of the second undersea terminal station device 52 outputs, to the second monitoring device 14, information indicating that there is concern about mounting of an interception device, or the like being performed. On receipt of the information indicating that there is concern about mounting of an interception device, or the like being performed, the second monitoring device 14 notifies the operator that mounting of an interception device, or the like is performed and there is concern about interception (step 120).

When notifying that there is concern about interception in step 120, the second monitoring device 14 checks whether or not a check result is input. When a check result is not input (No in step 121), the second monitoring device 14 waits until a check result is input.

The operator recognizing, via the second monitoring device 14, that there is concern about mounting of an interception device, or the like being performed checks communication equipment such as a communication device and a communication cable, and checks whether or not illegal communication interception is being performed by connection of an interception device, or the like. After checking whether or not illegal equipment for interception is present, the operator inputs a check result to the second monitoring device 14.

When a check result is input (Yes in step 121), the second monitoring device 14 checks whether or not the input check result indicates a normal state, i.e., a state where illegal equipment for interception is not present.

When the input check result is a result indicating a normal state (Yes in step 122), the second monitoring device 14 outputs an instruction to return to a normal operation, to the control unit 82 of the second undersea terminal station device 52.

On receipt of the instruction to return to a normal operation, the control unit 82 of the second undersea terminal station device 52 stops the output of the dummy pattern signal to the line module 71, and switches to output of a signal based on a user channel signal input from the client module 73 (step 119). When switching is made to the output of the signal based on actual data of the user channel signal input from the client module 73, transmission and reception of a normal optical signal based on the signal of the user channel between the first undersea terminal station device 51 and the second undersea terminal station device 52 are resumed.

When the input check result indicates a state where illegal equipment for interception is present and there is an abnormality (No in step 122), the output of the dummy pattern signal to the line module 71 is continued (step 123). By continuing the output of the dummy pattern signal, it is possible to perform removal of the interception device, or the like while avoiding interception of the actual data of the user channel signal by the third party performing interception.

In the transponder 61 according to the present example embodiment, the optical signal input from the wavelength multiplexing unit 62 is branched by the branching unit 76 at a stage prior to the line module 71, and optical power is measured. Instead of such a configuration, a current value of an output portion of a photoelectric conversion element of the receiving unit of the line module 71 may be measured, and optical power of an input optical signal may be measured. It is possible to reduce optical components used as the branching unit 76 by measuring the current value of the output portion of the photoelectric conversion element.

The optical communication system according to the present example embodiment measures optical power of an optical signal received in the reception-side transponder 61. Moreover, when a failure occurs, the reception-side transponder 61 transmits information about a difference of optical powers before the occurrence of the failure and after the elimination of the failure, to the transponder 61 opposed via the undersea relay line 15. The transmission-source transponder 61 compares the difference of optical powers with a predetermined standard. When the difference of optical powers is within the predetermined standard, the transmission-source transponder 61 determines that communication is not intercepted, and switches from a dummy pattern to output of a signal based on a user channel signal. In other words, on the basis of the difference of optical powers before the occurrence of the failure and after the elimination of the failure, the optical communication system according to the present example embodiment automatically performs authentication when a transmission signal is switched from a dummy pattern to a signal based on actual data.

Because the optical communication system according to the present example embodiment automatically determines that there is not any interception and then resumes communication of actual data, it is not necessary to wait for a check by the operator, and it is possible to early resume communication while preventing interception. Moreover, even when an interruption or the like of a signal frequently occurs, the operator does not need to take measures each time, and it is therefore possible to efficiently operate the optical communication system. As a consequence, the optical communication system according to the present example embodiment can more certainly prevent leakage of information when an interception device or the like is connected.

In the second and third optical communication systems, a transponder detecting a failure of a received signal transmits failure detection information to an opposed transponder. Instead of such a configuration, a transponder different from a transponder detecting a failure of a received signal may transmit failure detection information to an opposed-side terminal device. The transponder different from the transponder detecting the failure transmits the failure detection information, thereby making it possible to transmit the failure detection information to the opposed terminal device even when abnormalities occur on both a transmission side and a reception side between a wavelength multiplexing unit and a transponder.

Although the optical communication system configured as an undersea cable system is indicated in the second and third example embodiments, the optical communication system according to the second and third example embodiments may be a system which transfers an optical signal on the ground. Moreover, the technique of switching from a dummy pattern signal to a user channel signal after checking that there is not any interception in the optical communication system according to the second and third example embodiments can be applied even when an optical signal is not multiplexed on a transmission line between communication devices.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims This application is based upon and claims the benefit of priority from Japanese patent application No. 2016-41744, filed on Mar. 4, 2016, the disclosure of which is incorporated herein in its entirety by reference.

REFERENCE SIGNS LIST

1 Communication means
2 Monitoring means
3 Control means
4 Authentication means
11 First undersea terminal station device
12 Second undersea terminal station device
13 First monitoring device
14 Second monitoring device
15 Undersea relay line
16 User channel
17 User channel
20 Communication device
21 Transponder
22 Wavelength multiplexing unit
31 Line module
32 Frame processing unit
33 Client module
34 Test pattern generation unit
41 Frame generation unit
42 Control unit
43 Signal monitoring unit
51 First undersea terminal station device
52 Second undersea terminal station device
60 Communication device
61 Transponder
62 Wavelength multiplexing unit
71 Line module
72 Frame processing unit
73 Client module
74 Test pattern generation unit
75 Optical power monitoring unit
76 Branching unit
81 Frame generation unit
82 Control unit
83 Signal monitoring unit
84 Optical power storage unit

What is claimed is:

1. A communication device comprising:
  a communication interface configured to transmit to and receive an optical signal from an opposed device, which is a communication device opposed via a transmission line; and
  a processor configured to:
    monitor a transfer state of the optical signal transmitted from the communication interface, based on information acquired from another device;

control the communication interface to transmit a signal based on a dummy pattern instead of actual data when a failure in transfer of the optical signal has been detected to have occurred; and check whether or not a start of transmission of a signal based on the actual data is possible, and authenticate the start of transmission of the signal based on the actual data, when elimination of the failure in the transfer of the optical signal has been detected to have occurred, while the signal based on the dummy pattern is being transmitted, wherein the processor is further configured to: control the communication interface to transmit the signal based on the actual data unit instead of the dummy pattern when the start of the transmission has been authenticated.

2. The communication device according to claim 1, wherein the processor is further configured to: detect the occurrence of the failure and the elimination of the failure in the opposed device, based on information included in the optical signal transmitted from the opposed device via the transmission line.

3. The communication device according to claim 1, wherein the processor is further configured to: output information indicating that the failure has been eliminated to a predetermined device, and acquire the authentication of starting transmission of the signal based on the actual data from the predetermined device.

4. The communication device according to claim 1, wherein the processor is further configured to: start transmission of the signal based on the actual data when a difference of optical powers of the optical signal received by the opposed device before the occurrence of the failure and after the elimination of the failure is within a predetermined standard.

5. A communication device comprising:
a communication interface configured to transmit to and receive an optical signal from an opposed device, which is a communication device opposed via a transmission line; and
a processor configured to:
monitor a reception state of the optical signal received in the communication unit; and
control the communication interface to transmit information indicating that a failure occurred to the opposed device when a failure in reception of the optical signal has been detected to have occurred, and control the communication interface to transmit information indicating that the detected failure in the reception of the optical signal has been eliminated to the opposed device when a predetermined dummy pattern is detected in the optical signal received by the communication interface.

6. The communication device according to claim 5, wherein the processor is further configured to:
measure optical power of the optical signal received by the communication interface, and
control the communication interface to transmit information about a difference of the optical powers before the occurrence of the failure and after the elimination of the failure to the opposed device.

7. An optical communication system comprising:
the communication device according to claim 1, which is a first terminal station device; and
a second terminal station device comprising:
another communication interface configured to: transmit to and receive an optical signal from an opposed device, which communication device opposed via a transmission line; and
another processor configured to:
monitor a reception state of the optical signal received by the other communication interface, and
control the other communication interface to transmit information indicating that a failure in reception of the optical signal has been detected to have occurred to the opposed device when the failure in reception of the optical signal has been detected to have occurred, and control the other communication interface to transmit information indicating that the detected failure has been eliminated to the opposed device when a predetermined dummy pattern is detected in the optical signal received by the other communication interface, wherein
when the failure in the optical signal received from the first terminal station device via the transmission line has been detected to have occurred, the other processor is further configured to: control the other communication interface to transmit information indicating that the failure occurred in the reception of the optical signal to the first terminal station device, and
the optical signal based on the dummy pattern is transmitted to the second terminal station device from the first terminal station device via the transmission line.

8. A communication method comprising:
transmitting to and receiving an optical signal from an opposed device, which is a communication device opposed via a transmission line;
monitoring a transfer state of the transmitted optical signal, based on information acquired from another device;
transmitting a signal based on a dummy pattern instead of actual data when a failure in transfer of the optical signal has been detected to have occurred;
checking whether or not a start of transmission of a signal based on the actual data is possible, when elimination of the detected failure in the transfer of the optical signal has been detected to have occurred, while the optical signal based on the dummy pattern is being transmitted; and
transmitting the optical signal based on the actual data instead of the dummy pattern when the start of the transmission has been authenticated.

9. The communication method according to claim 8, wherein the start of the transmission of the optical signal based on the actual data is authenticated when a difference of optical powers of the optical signal received by the opposed device before the occurrence of the detected failure in the transfer of the optical signal, and an occurrence of the elimination of the detected failure in the transfer of the optical signal is within a predetermined standard.

10. The communication method according to claim 8, further comprising:
monitoring a reception state of the optical signal in the opposed device;
when a failure in reception of the optical signal has been detected to have occurred, transmitting information indicating that the failure in the reception of the optical signal has occurred from the opposed device as information about the reception state; and when detecting the elimination of the failure in the reception of the optical signal, transmitting information indicating that the failure in the reception of the optical signal has been detected as being eliminated from the opposed device as information about the reception state.

11. The communication method according to claim 8, further comprising: detecting the occurrence of the detected failure in the transfer of the optical signal has been detected to have occurred, and the elimination of the detected failure in the transfer of the optical signal in the opposed device, based on information included in the optical signal transmitted from the opposed device via the transmission line.

12. The communication method according to claim 8, further comprising: outputting information indicating that the detected failure in the transfer of the optical signal has been eliminated to a predetermined device, and acquiring the authentication of the starting of the transmission of the optical signal based on the actual data from the predetermined device.

* * * * *